(12) United States Patent
Hori

(10) Patent No.: US 7,480,592 B2
(45) Date of Patent: Jan. 20, 2009

(54) REMOTE DIAGNOSIS DEVICE, REMOTE DIAGNOSIS SYSTEM AND PROGRAM PRODUCT

(75) Inventor: Masaaki Hori, Tajimi (JP)

(73) Assignee: Brother Kogyo Kabushiki Kaisha (JP)

( * ) Notice: Subject to any disclaimer, the term of this patent is extended or adjusted under 35 U.S.C. 154(b) by 63 days.

(21) Appl. No.: 11/270,743

(22) Filed: Nov. 10, 2005

(65) Prior Publication Data

US 2006/0123302 A1 Jun. 8, 2006

(30) Foreign Application Priority Data

Nov. 11, 2004 (JP) .............................. 2004-327909

(51) Int. Cl.
*G06F 15/00* (2006.01)

(52) U.S. Cl. .................................................... 702/183

(58) Field of Classification Search ............. 702/56–58, 702/65, 68, 69, 80, 81, 90, 119–122, 182–186, 702/188, 190; 700/95; 709/224, 238; 717/177; 710/15, 58; 455/419, 420; 370/235
See application file for complete search history.

(56) References Cited

U.S. PATENT DOCUMENTS

| | | | |
|---|---|---|---|
| 5,768,284 A | 6/1998 | Cox | |
| 6,023,507 A | 2/2000 | Wookey | |
| 6,535,865 B1 | 3/2003 | Skaanning et al. | |
| 6,879,973 B2 | 4/2005 | Skaanning et al. | |
| 6,973,491 B1 * | 12/2005 | Staveley et al. | 709/224 |
| 2002/0002414 A1 * | 1/2002 | Hsiung et al. | 700/95 |
| 2002/0128943 A1 | 9/2002 | Schreckengast et al. | |
| 2004/0073654 A1 | 4/2004 | Sarma | |
| 2004/0125393 A1 | 7/2004 | Maehara | |
| 2004/0227953 A1 * | 11/2004 | Mathur | 356/496 |
| 2004/0236843 A1 | 11/2004 | Wing et al. | |
| 2005/0108426 A1 * | 5/2005 | Klein | 709/238 |

FOREIGN PATENT DOCUMENTS

| | | |
|---|---|---|
| JP | 8235016 | 9/1996 |
| JP | 9233234 | 9/1997 |
| JP | 11-143730 A | 5/1999 |
| JP | 2000293342 | 10/2000 |
| JP | 2001075808 | 3/2001 |
| JP | 2001345979 | 12/2001 |

(Continued)

OTHER PUBLICATIONS

European Search Report for corresponding European Application No. 05256972.0.

(Continued)

*Primary Examiner*—Edward Raymond
*Assistant Examiner*—Mohamed Charioui
(74) *Attorney, Agent, or Firm*—Banner & Witcoff, Ltd.

(57) ABSTRACT

In a remote diagnosis system, characteristics data, including at least information indicating characteristics of a terminal device is obtained. Then, a filter based on the obtained characteristics data from a filter group including a plurality of types of filters in which a diagnostic item for outputting is set according to the characteristics of the terminal device is selected. The state of the terminal device is then diagnosed based on setting information of the selected filter. The diagnostic result of the state is then outputted.

21 Claims, 25 Drawing Sheets

FOREIGN PATENT DOCUMENTS

| | | |
|---|---|---|
| JP | 2002-288067 A | 10/2002 |
| JP | 2002304261 | 10/2002 |
| JP | 2003241921 | 8/2003 |
| JP | 2004130790 | 4/2004 |
| JP | 2004-514208 A | 5/2004 |
| JP | 2004-265226 A | 9/2004 |
| WO | 02/41105 A2 | 5/2002 |
| WO | WO 02/41105 | 5/2002 |

OTHER PUBLICATIONS

Notification for Reason of Refusal in Japanese Application No. 2004-327909 dated Dec. 4, 2007 and English translation thereof.

Office Action in corresponding Japanese Application No. JP2004-327909.

* cited by examiner

FIG. 7

| ID | PRODUCT INFORMATION· MEASUREMENT RESULTS | DESCRIPTION |
|---|---|---|
| 1 | 8XA123 | MODEL INFOMATION |
| 2 | 1001 | DESTINATION INFOMATION |
| 3 | F4C3202331 | DEVICE NUMBER |
| 4 | 2004/10/10 | MANUFACTURING DATE |
| 5 | 1022 | PROGRAM VERSION |
| 6 | 2004/11/01 10:23:30 | DATA COLLECTION DATE |
| | | |
| 2001 | CCD | READING DEVICE TYPE |
| | | |
| 2004 | 89 | READ EXECUTION COUNT |
| 2005 | OK | READING MECHANISM ERROR STATUS |
| | | |
| 3001 | 201 | PC PRINT COUNT |
| 3002 | 254 | COPY COUNT |
| 3003 | 32 | FAX RECORD COUNT |
| 3004 | 28 | NUMBER OF FAX JOBS |
| 3006 | 435231 | AMOUNT OF INK USED (K) |
| 3007 | 234532 | AMOUNT OF INK USED (Y) |
| 3008 | 239034 | AMOUNT OF INK USED (C) |
| 3009 | 192384 | AMOUNT OF INK USED (M) |
| 3010 | OK | READING MECHANISM ERROR STATUS |
| | | |
| 4001 | 21 | NUMBER OF FAX TRANSMISSION JOBS |
| 4002 | 28 | NUMBER OF FAX RECEPTION JOBS |
| 4006 | OK | COMMUNICATION FUNCTION STATUS |
| 4007 | 20323321:OK:3 | RECORD OF LAST FAX TRANSMISSION DESTINATION |

FIG. 9

| FILTER F1 | | | | | | |
|---|---|---|---|---|---|---|
| MODEL INFORMATION | 8XA123 | | | | | |
| DESTINATION INFORMATION | 1001 | | | | | |
| | DETERMINATION CONDITIONS | JAPANESE | | ENGLISH | | |
| ID | | MESSAGE M1 | MESSAGE M2 | MESSAGE M1 | MESSAGE M2 | |
| 3010 | ID(3010) = OK | PC 印刷機能 | 正常です | PC print function | Good | |
| 3010 | ID(3010) != OK | PC 印刷機能 | 問題があります。弊社サービスに御連絡ください(0123-3345-4443) | PC print function | Please contact our service center (0123-3345-2232) | |
| 4006 | ID(4006) = OK | FAX 通信機能 | 正常です | Fax Transmission | Good | |
| 4006 | ID(4006) != OK | FAX 通信機能 | 問題があります。弊社サービスに御連絡ください(0123-34565-4443) | Fax Transmission | Please contact our service center (0123-3345-2232) | |
| 2005 | ID(2005) != OK | 読取機能 | 問題があります。弊社サービスに御連絡ください(0123-34565-4443) | Scanner Function | Please contact our service center (0123-3345-2232) | |
| 2005 & 3010 | ID(2005) = OK & ID(3010) = OK | コピー機能 | 正常です | Copy function | Good | |
| 3006 | ID(3006) >= 680000 & ID(3006) < 720000 | | ご注意:黒インクが残りあとわずかです。早めの御購入をお勧めします。 | | Information: Black ink is near empty. Please prepare new one. | |
| 3006 | ID(3006) >= 720000 | | ご注意:黒インクがなくなりました。交換をお願いします。 | | Information: Black ink is empty. Please change to new one | |
| 3007 | ID(3007) >= 680000 & ID(3007) < 720000 | | ご注意:イエローインクが残りあとわずかです。早めの御購入をお勧めします。 | | Information: Yellow ink is near empty. Please prepare new one. | |
| 3007 | ID(3007) >= 720000 | | ご注意:イエローインクがなくなりました。交換をお願いします。 | | Information: Yellow ink is empty. Please change to new one | |
| 3008 | ID(3008) >= 680000 & ID(3008) < 720000 | | ご注意:シアンインクが残りあとわずかです。早めの御購入をお勧めします。 | | Information: Cyan ink is near empty. Please prepare new one. | |
| 3008 | ID(3008) >= 720000 | | ご注意:シアンインクがなくなりました。交換をお願いします。 | | Information: Cyan ink is empty. Please change to new one | |
| 3009 | ID(3009) >= 680000 & ID(3009) < 720000 | | ご注意:マゼンタインクが残りあとわずかです。早めの御購入をお勧めします。 | | Information: Magenta ink is near empty. Please prepare new one. | |
| 3009 | ID(3009) >= 720000 | | ご注意:マゼンタインクがなくなりました。交換をお願いします。 | | Information: Magenta ink is empty. Please change to new one | |

FIG. 10

FILTER F2

| MODEL INFORMATION | 8XA123 |
| --- | --- |
| DESTINATION INFORMATION | 1002 |

| ID | DETERMINATION CONDITIONS | JAPANESE | | ENGLISH | |
| --- | --- | --- | --- | --- | --- |
| | | MESSAGE M1 | MESSAGE M2 | MESSAGE M1 | MESSAGE M2 |
| 4006 | ID(4006) = OK | FAX 通信機能 | 正常です | Fax Transmission | Good |
| 4006 | ID(4006) != OK | FAX 通信機能 | 問題があります。弊社サービスに御連絡ください (0123-34565-4443) | Fax Transmission | Please contact our service center (0123-3345-2232) |
| 2005 | ID(2005) != OK | 読取機能 | 問題があります。弊社サービスに御連絡ください (0123-34565-4443) | Scanner Function | Please contact our service center (0123-3345-2232) |
| 2005 & 3010 | ID(2005) = OK & ID(3010) = OK | コピー機能 | 正常です | Copy function | Good |
| 3006 | ID(3006) >= 680000 & ID(3006) < 720000 | | 御注意:黒インクが残りあとわずかです。早めの御購入をお勧めいたします。 | | Information: Black ink is near empty. Please prepare new one. |
| 3006 | ID(3006) >= 720000 | | 御注意:黒インクがなくなりました。交換をお願いします。 | | Information: Black ink is empty. Please change to new one. |
| 3007 | ID(3007) >= 680000 & ID(3007) < 720000 | | 御注意:イエローインクが残りあとわずかです。早めの御購入をお勧めいたします。 | | Information: Yellow ink is near empty. Please prepare new one. |
| 3007 | ID(3007) >= 720000 | | ご注意:イエローインクがなくなりました。交換をお願いします。 | | Information: Yellow ink is empty. Please change to new one |
| 3008 | ID(3008) >= 680000 & ID(3008) < 720000 | | 御注意:シアンインクが残りあとわずかです。早めの御購入をお勧めいたします。 | | Information: Cyan ink is near empty. Please prepare new one. |
| 3008 | ID(3008) >= 720000 | | ご注意:シアンインクがなくなりました。交換をお願いいたします。 | | Information: Cyan ink is empty. Please change to new one |
| 3009 | ID(3009) >= 680000 & ID(3009) < 720000 | | 御注意:マゼンタインクが残りあとわずかです。早めの御購入をお勧めいたします。 | | Information: Magenta ink is near empty. Please prepare new one. |
| 3009 | ID(3009) >= 720000 | | ご注意:マゼンタインクがなくなりました。交換をお願いします。 | | Information: Magenta ink is empty. Please change to new one |

FIG. 11

FILTER F3

| MODEL INFORMATION | 8XA123 |
|---|---|
| DESTINATION INFORMATION | 2001 |

| ID | DETERMINATION CONDITIONS | JAPANESE MESSAGE M1 | JAPANESE MESSAGE M2 | ENGLISH MESSAGE M1 | ENGLISH MESSAGE M2 |
|---|---|---|---|---|---|
| 3010 | ID(3010) = OK | PC 印刷機能 | 正常です | PC print function | Good |
| 3010 | ID(3010) != OK | PC 印刷機能 | 問題があります。弊社サービスに御連絡ください (0123-34565-4443) | PC print function | Please contact our service center (0123-3345-2232) |
| 4006 | ID(4006) = OK | FAX 通信機能 | 正常です | Fax Transmission | Good |
| 4006 | ID(4006) != OK | FAX 通信機能 | 問題があります。弊社サービスに御連絡ください (0123-34565-4443) | Fax Transmission | Please contact our service center (0123-3345-2232) |
| 2005 | ID(2005) != OK | 読取機能 | 問題があります。弊社サービスに御連絡ください (0123-34565-4443) | Scanner Function | Please contact our service center (0123-3345-2232) |
| 2005 & 3010 | ID(2005) = OK & ID(3010) = OK | コピー機能 | 正常です | Copy function | Good |
| 3006 | ID(3006) >= 680000 & ID(3006) < 720000 | | ご注意：黒インクが残りあとわずかです。早めの御購入をお勧めします。 | | Information: Black ink is near empty. Please prepare new one. |
| 3006 | ID(3006) >= 720000 | | ご注意：黒インクがなくなりました。支換をお願いします。 | | Information: Black ink is empty. Please change to new one |
| 3007 | ID(3007) >= 680000 & ID(3007) < 720000 | | ご注意：イエローインクが残りあとわずかです。早めの御購入をお勧めします。 | | Information: Yellow ink is near empty. Please prepare new one. |
| 3007 | ID(3007) >= 720000 | | ご注意：イエローインクがなくなりました。支換をお願いします。 | | Information: Yellow ink is empty. Please change to new one |
| 3008 | ID(3008) >= 680000 & ID(3008) < 720000 | | ご注意：シアンインクが残りあとわずかです。早めの御購入をお勧めします。 | | Information: Cyan ink is near empty. Please prepare new one. |
| 3008 | ID(3008) >= 720000 | | ご注意：シアンインクがなくなりました。支換をお願いします。 | | Information: Cyan ink is empty. Please change to new one |
| 3009 | ID(3009) >= 680000 & ID(3009) < 720000 | | ご注意：マゼンタインクが残りあとわずかです。早めの御購入をお勧めします。 | | Information: Magenta ink is near empty. Please prepare new one. |
| 3009 | ID(3009) >= 720000 | | ご注意：マゼンタインクがなくなりました。支換をお願いします。 | | Information: Magenta ink is empty. Please change to new one |
| * | * | — | | Job status | |
| * | * | | (SP) | Fax Function | (SP) |
| 4001 | * | | ID(4001) ジョブ完了 | Fax Transmission | ID(4001) Jobs complete |
| 4002 | * | | ID(4002) ジョブ完了 | Fax Receive | ID(4002) Jobs complete |
| 3001 | * | | ID(3001) ページ | PC print jobs | ID(3001) jobs |
| 3002 | * | | ID(3002) ページ | Copy jobs | ID(3002) jobs |

FIG. 12

FILTER F1

| MODEL INFORMATION | 8XA123 |
| --- | --- |
| DESTINATION INFORMATION | 2002 |

| ID | DETERMINATION CONDITIONS | JAPANESE | | ENGLISH | |
| --- | --- | --- | --- | --- | --- |
| | | MESSAGE M1 | MESSAGE M2 | MESSAGE M1 | MESSAGE M2 |
| 3010 | ID(3010) == OK | PC 印刷機能 | 正常です | PC print function | Good |
| 3010 | ID(3010) != OK | PC 印刷機能 | 問題があります。弊社サービスに御連絡ください (0123-34565-4443) | PC print function | Please contact our service center (0123-3345-2232) |
| 4006 | ID(4006) == OK | FAX 通信機能 | 正常です | Fax Transmission | Good |
| 4006 | ID(4006) != OK | FAX 通信機能 | 問題があります。弊社サービスに御連絡ください (0123-34565-4443) | Fax Transmission | Please contact our service center (0123-3345-2232) |
| 2005 | ID(2005) != OK | 読取機能 | 問題があります。弊社サービスに御連絡ください (0123-34565-4443) | Scanner Function | Please contact our service center (0123-3345-2232) |
| 2005 & 3010 | ID(2005) == OK & ID(3010) == OK | コピー機能 | 正常です | Copy function | Good |
| 3006 | ID(3006) >= 680000 & ID(3006) < 720000 | | 御注意：黒インクが残りあとわずかです。早めの御購入をお勧めします。 | | Information: Black ink is near empty. Please prepare new one. |
| 3006 | ID(3006) >= 720000 | | ご注意：黒インクがなくなりました。交換をお願いします。 | | Information: Black ink is empty. Please change to new one |
| 3007 | ID(3007) >= 680000 & ID(3007) < 720000 | | 御注意：イエローインクが残りあとわずかです。早めの御購入をお勧めします。 | | Information: Yellow ink is near empty. Please prepare new one. |
| 3007 | ID(3007) >= 720000 | | ご注意：イエローインクがなくなりました。交換をお願いします。 | | Information: Yellow ink is empty. Please change to new one |
| 3008 | ID(3008) >= 680000 & ID(3008) < 720000 | | 御注意：シアンインクが残りあとわずかです。早めの御購入をお勧めします。 | | Information: Cyan ink is near empty. Please prepare new one. |
| 3008 | ID(3008) >= 720000 | | ご注意：シアンインクがなくなりました。交換をお願いします。 | | Information: Cyan ink is empty. Please change to new one |
| 3009 | ID(3009) >= 680000 & ID(3009) < 720000 | | 御注意：マゼンタインクが残りあとわずかです。早めの御購入をお勧めします。 | | Information: Magenta ink is near empty. Please prepare new one. |
| 3009 | ID(3009) >= 720000 | | ご注意：マゼンタインクがなくなりました。交換をお願いします。 | | Information: Magenta ink is empty. Please change to new one |
| 3 | ID(3) = F4C3202331 | Filter (F4C3202331) | | | |

← LINK TO REFERENCE FILTER

FIG. 13

| | REFERENCE FILTER | | |
|---|---|---|---|
| * | * | | THANK YOU FOR USING OUR PRODUCT. YOUR DEVICE STATUS IS GIVEN ABOVE. IF YOU HAVE ANY QUESTIONS, PLEASE CONTACT OUR SERVICE CENTER (0123-2345-5678). |
| * | * | JOB STATUS | — |
| * | * | FAX FUNCTION | (SP) |
| 4001 | * | FAX TRANSMISSION | ID(4001) JOBS COMPLETED |
| 4002 | * | FAX RECEPTION | ID(4002) JOBS COMPLETED |
| 4007 | ID(4007:2) = OK | LAST TRANSMISSION RESULT | ID(4007:3) PAGES WERE SENT TO (ID:4007:1) AND TRANSMISSION WAS NORMALLY TERMINATED. |
| 4007 | ID(4007:2) = Redial-OK | LAST TRANSMISSION RESULT | ID(4007:3) PAGES WERE SENT TO (ID:4007:1) RETRANSMISSION WAS PERFORMED AND NORMALLY TERMINATED. |
| 4007 | ID(4007:2) = NG | LAST TRANSMISSION RESULT | ID(4007:3) PAGES WERE SENT TO (ID:4007:1) RETRANSMISSION WAS PERFORMED BUT FAILED. PLEASE RESEND. |
| 3001 | * | PC PRINT | ID(3001) PAGES |
| 3002 | * | COPY | ID(3002) PAGES |

FIG. 14A

| CUSTOMER DEVICE STATUS | |
|---|---|
| PC PRINT FUNCTION | GOOD |
| FAX TRANSMISSION FUNCTION | GOOD |
| COPY FUNCTION | GOOD |

FIG. 14B

| CUSTOMER DEVICE STATUS | |
|---|---|
| PC PRINT FUNCTION | GOOD |
| FAX TRANSMISSION FUNCTION | GOOD |
| COPY FUNCTION | GOOD |

| JOB STATUS | |
|---|---|
| FAX FUNCTION | |
| FAX TRANSMISSION | 21 JOBS COMPLETED |
| FAX RECEPTION | 28 JOBS COMPLETED |
| PC PRINT | 201 PAGES |
| COPY | 254 PAGES |

INFORMATION: MAGENTA INK IS NEAR EMPTY. PLEASE PREPARE NEW ONE.

FIG. 14C

| CUSTOMER DEVICE STATUS | |
|---|---|
| PC PRINT FUNCTION | GOOD |
| FAX TRANSMISSION FUNCTION | GOOD |
| COPY FUNCTION | GOOD |

| JOB STATUS | |
|---|---|
| FAX FUNCTION | |
| FAX TRANSMISSION | 21 JOBS COMPLETED |
| FAX RECEPTION | 28 JOBS COMPLETED |
| LAST TRANSMISSION RESULT | 3 PAGES WERE SEND TO 20323321 AND TRANSMISSION WAS NORMALLY TERMINATED. |
| PC PRINT | 201 PAGES |
| COPY | 254 PAGES |

THANK YOU FOR USING OUR PRODUCT. YOUR DEVICE STATUS IS GIVEN ABOVE. IF YOU HAVE ANY QUESTIONS, PLEASE CONTACT OUR SERVICE CENTER (0123-2345-5678).

FIG. 21

FILTER F5

| MODEL INFORMATION | 8XA123 |
| --- | --- |
| DESTINATION INFORMATION | 1002 |

| ID | DETERMINATION CONDITIONS | JAPANESE | | ENGLISH | |
| --- | --- | --- | --- | --- | --- |
| | | MESSAGE M1 | MESSAGE M2 | MESSAGE M1 | MESSAGE M2 |
| 4006 | ID(4006) = OK | FAX 送信機能 | 正常です。 | Fax Transmission | Good |
| 4006 | ID(4006) != OK | FAX 送信機能 | 問題があります。弊社サービスに御連絡ください(0123-34565-4443) | Fax Transmission | Please contact our service center (0123-3345-2232) |
| 2005 | ID(2005) != OK | 読取機能 | 問題があります。弊社サービスに御連絡ください(0123-34565-4443) | Scanner Function | Please contact our service center (0123-3345-2232) |
| 2005 & 3010 | ID(2005) = OK & ID(3010) = OK | コピー機能 | 正常です。 | Copy function | Good |
| 3006 | ID(3006) >= 680000 & ID(3006) < 720000 | | 御注意:黒インクが残りわずかです。早めの御購入をお勧めします。 | | Information: Black ink is near empty. Please prepare new one. |
| 3006 | ID(3006) >= 720000 | | ご注意:黒インクがなくなりました。交換をお願いします。 | | Information: Black ink is empty. Please change to new one |
| 3007 | ID(3007) >= 680000 & ID(3007) < 720000 | | 御注意:イエローインクが残りわずかです。早めの御購入をお勧めします。 | | Information: Yellow ink is near empty. Please prepare new one. |
| 3007 | ID(3007) >= 720000 | | ご注意:イエローインクがなくなりました。交換をお願いします。 | | Information: Yellow ink is empty. Please change to new one |
| 3008 | ID(3008) >= 680000 & ID(3008) < 720000 | | 御注意:シアンインクが残りわずかです。早めの御購入をお勧めします。 | | Information: Cyan ink is near empty. Please prepare new one. |
| 3008 | ID(3008) >= 720000 | | ご注意:シアンインクがなくなりました。交換をお願いします。 | | Information: Cyan ink is empty. Please change to new one |
| 3009 | ID(3009) >= 680000 & ID(3009) < 720000 | | 御注意:マゼンタインクが残りわずかです。早めの御購入をお勧めします。 | | Information: Magenta ink is near empty. Please prepare new one. |
| 3009 | ID(3009) >= 720000 | | ご注意:マゼンタインクがなくなりました。交換をお願いします。 | | Information: Magenta ink is empty. Please change to new one |
| 3006 | ID(3006) >= Func(3006) & ID(3006) < 680000 | | 御注意:お客様のご使用状況から見て、まもなく黒インクがなくなる可能性があります。早めの御購入をお勧めします。 | | Information: According to your usage, Black ink will be empty soon. Please prepare the new one. |

← PARAMETER INCLUDING FUNCTION

FIG. 25

| CUSTOMER DEVICE STATUS ||
|---|---|
| FAX COMMUNICATION FUNCTION | GOOD |
| COPY FUNCTION | GOOD |

INFORMATION: BLACK INK IS LIKELY TO BE EMPTY SOON, ACCORDING TO YOUR USAGE STATUS. PLEASE PREPARE NEW ONE.

REMOTE DIAGNOSIS DEVICE, REMOTE DIAGNOSIS SYSTEM AND PROGRAM PRODUCT

CROSS REFERENCE TO RELATED APPLICATION

This application claims priority from Japanese Patent Application No. 2004-327909, filed on Nov. 11, 2004, the entire subject matter of which is incorporated herein by reference.

TECHNICAL FIELD

Aspects of the present invention relate to a remote diagnosis device for diagnosing a variety of states of a terminal device and transmitting diagnostic results of the variety of states to the terminal device or a management device for managing the terminal device over a network.

BACKGROUND

Remote diagnosis systems for diagnosing a variety of states of image forming devices such as printers or multifunction devices via a network are widely used recently

SUMMARY

Since there are a great number of models of image forming devices, and image forming devices of the same model also have different functions depending on their destinations, measurement items according to each of the models or destinations must be set in the diagnostic program.

If image forming devices are used in a plurality of nations (for example, in both Japan and the United States), a plurality of corresponding languages must be set to display diagnostic items or diagnostic results.

According to an aspect of the present invention, there is provided a remote diagnosis device for diagnosing a state of a terminal device and outputting, the remote diagnosis device including: a first obtaining unit that receives characteristics data, including at least information indicating characteristics of the terminal device; a filter group including a plurality of types of filters in which a diagnostic item for outputting is set according to the characteristics of the terminal device; a filter selection unit that selects a filter corresponding to the characteristics of the terminal device; and a diagnosis result outputting unit that diagnoses the state of the terminal device based on setting information of the filter selected by the filter selection unit, and outputs the diagnostic result.

In this remote diagnosis device, the first obtaining unit receives the characteristics data from the terminal device or a management device over a network, and a second obtaining unit receives measurement results from the terminal device or the management device over the network.

The filter selection unit selects the filter according to the terminal device from the filter group, based on the characteristics data received by the first obtaining unit, and the diagnosis result outputting unit diagnoses a variety of states of the terminal device based on both setting information (i.e , diagnostic items for transmission to the terminal device or the management device and determination conditions of the diagnostic results for the measurement results) of the filter selected by the filter selection unit and the measurement results received by the second obtaining unit and transmits diagnostic results of the variety of states and corresponding diagnostic items to the terminal device or the management device over the network.

Even if this remote diagnosis device is implemented, for example, in such a way that the program, in which measurement items of all types of terminal devices are set, allows the terminal device or the management device to collect measurement results and the terminal device or the management device is notified of diagnostic items or diagnostic results of the measurement items, the diagnostic items for transmission to the terminal device or the management device and determination conditions of the diagnostic results are determined using the filter according to the characteristics of the terminal device.

The characteristics of the terminal device correspond to, for example, the model or destinations of the terminal device.

The program for diagnosing the terminal device may be preset in the terminal device or the management device and may also be set to be downloaded from the remote diagnosis device to the terminal device or the management device.

BRIEF DESCRIPTION OF THE DRAWINGS

Illustrative aspects of the invention may be more readily described with reference to the accompanying drawings:

FIG. 7 illustrates an example of model information, destination information, a product number, and a variety of measurements, and IDs corresponding respectively to these values, transmitted by the CPU of the multifunction device;

FIG. 9 illustrates an example description of a filter F1;

FIG. 10 illustrates an example description of a filter F2;

FIG. 11 illustrates an example description of a filter F3;

FIG. 12 illustrates an example description of a filter F4;

FIG. 13 illustrates an example description of a reference filter;

FIGS. 14A to 14C are example messages displayed on a display by the CPU of the PC;

FIG. 21 illustrates an example description of a filter F5;

FIG. 25 illustrates an example message displayed on a display by the CPU of the PC.

DETAILED DESCRIPTION

Now, illustrative aspects of the present invention will be described with reference to the accompanying drawings.

Figure 1:
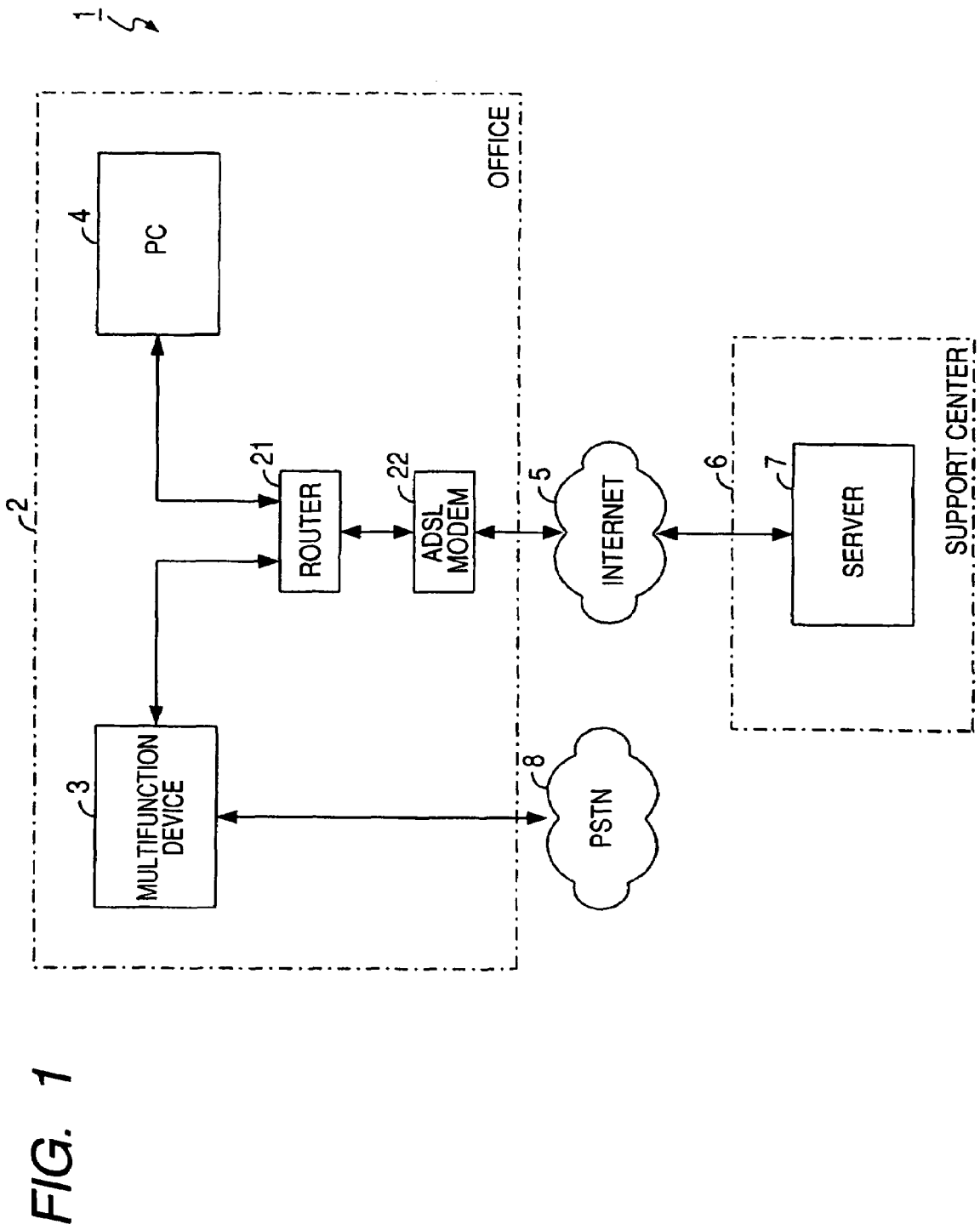
FIG. 1 is a block diagram of a remote diagnosis system to which an aspect of the present invention is applied.

FIG. 1 is a block diagram of a remote diagnosis system 1 to which an aspect of the present invention is applied.

As shown in FIG. 1, the remote diagnosis system 1 is constructed by connecting a multifunction device 3 and a personal computer (hereinafter referred to as a "PC" for short) 4, which are installed in an office 2 of a user of the remote diagnosis system 1, to a server 7 installed in a support center 6 via the Internet 5.

More specifically, in the office 2, the multifunction device 3 and the PC 4 are connected to a router 21 which doubles as a hub, thereby establishing a Local Area Network (LAN) comprising the multifunction device 3 and the PC 4, and the router 21 is connected to the Internet 5 via an ADSL modem 22, thereby connecting the multifunction device 3 and the PC 4 to the server 7 via the Internet 5. The multifunction device 3 in the office 2 is also connected to an external Public Switched Telephone Network (PSTN) 8.

Figure 2:
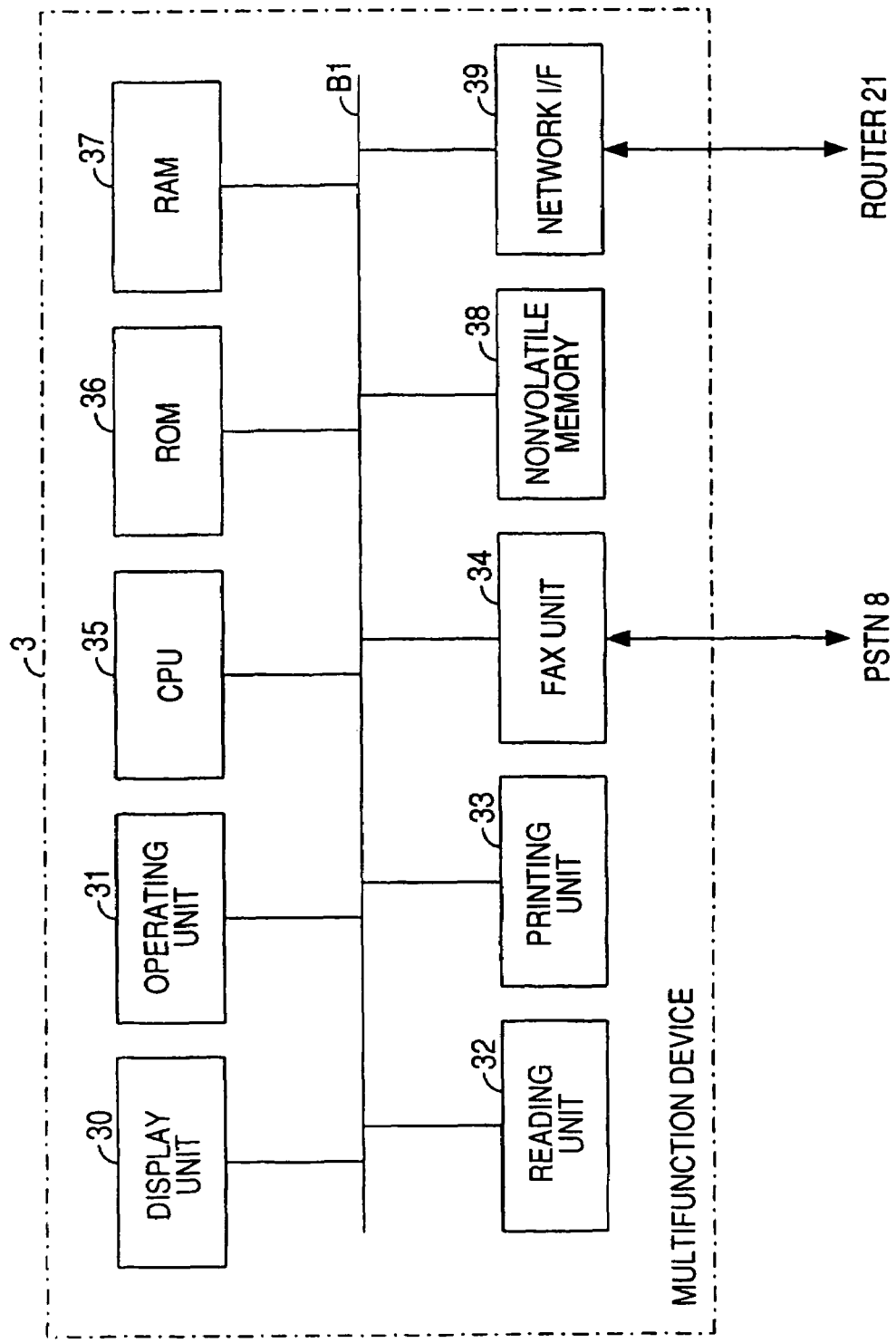
FIG. 2 is an electrical block diagram of a multifunction. device in the remote diagnosis system of FIG. 1.

FIG. 2 is an electrical block diagram of the multifunction device 3.

As shown in FIG. 2, the multifunction device 3 comprises a display unit 30, an operating unit 31, a reading unit 32, a printing unit 33, and a fax unit 34. The display unit 30 controls a display device (not shown) for displaying states, etc., of the multifunction device 3. The operating unit 31 generates a variety of operation signals in response to operations of a variety of switches for operating the multifunction device 3. The reading unit 32 controls a reading mechanism (not shown) for reading printed matter and processes read data. The printing unit 33 controls a printing device (not shown) for performing printing on sheets. The fax unit 34 performs fax communication via the PSTN 8.

The multifunction device 3 also comprises a CPU 35, a ROM 36, a RAM 37, a nonvolatile memory 38, and a network interface (I/F) 39. The CPU 35 performs overall control of the components of the multifunction device 3. The ROM 36 stores programs for a variety of processes to be performed by the CPU 35, product 26 information indicating characteristics of the multifunction device 3, and the like. In the present aspect, the product information includes model information, destination information, a product number, or the like. The RAM 37 is used as a storage area when the CPU 35 performs a variety of processes. The nonvolatile memory 38 stores data produced or errors occurring when the CPU 35 performs a variety of processes. The network interface 39 interfaces the CPU 35 with the router 21.

These components of the multifunction device 3 are connected to each other via a signal bus B1.

Figure 3:
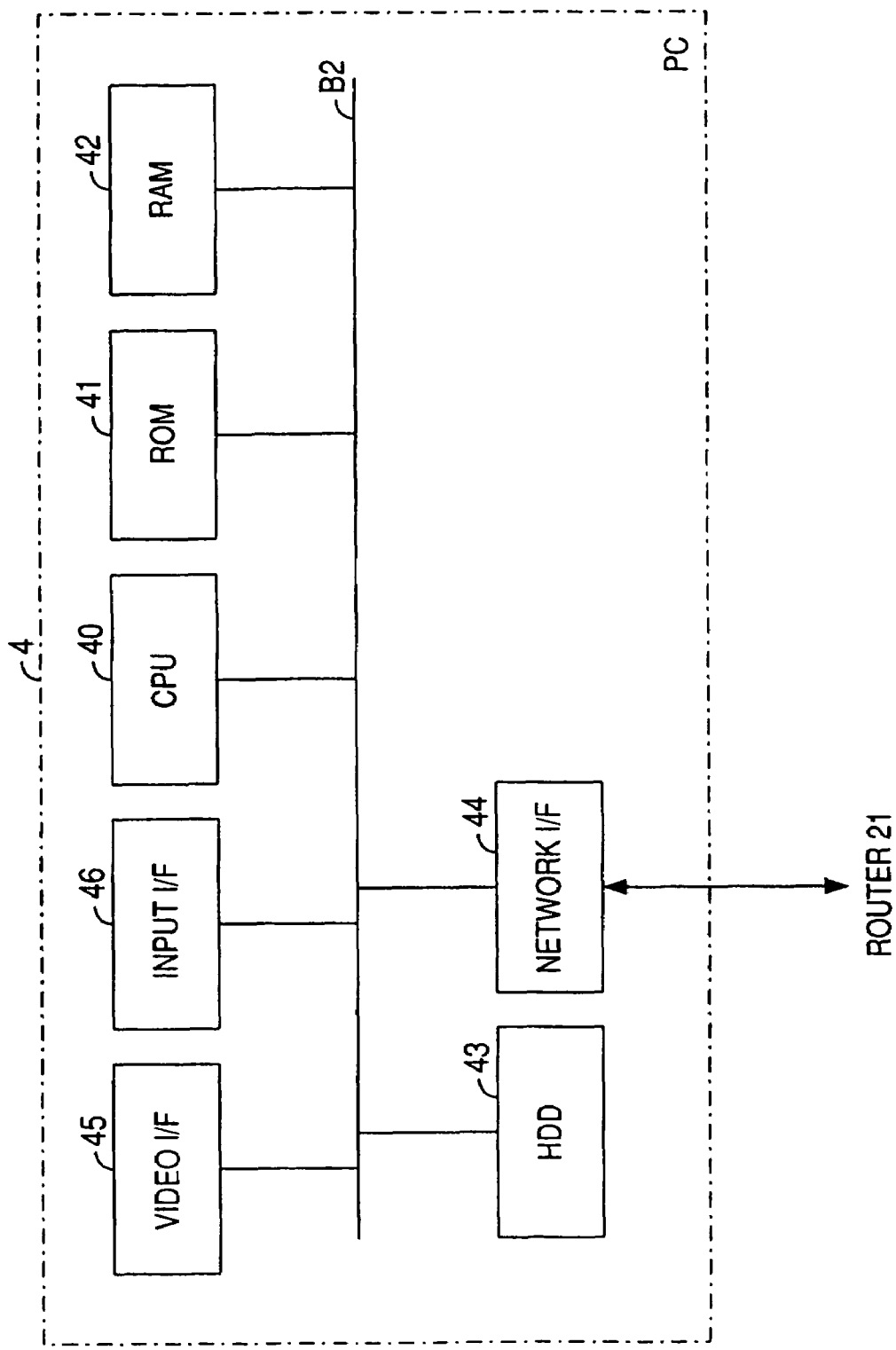
FIG. 3 is an electrical block diagram of a PC in the remote diagnosis system of FIG. 1.

FIG. 3 is an electrical block diagram of the PC 4.

As shown in FIG. 3, the PC 4 comprises a CPU 40, a ROM 41, a RAM 42, a hard drive (hereinafter, referred to as an "HDD" for short) 43, a network interface 44. The CPU 40 performs a variety of processes to be performed by the PC 4. The ROM 41 stores a program (BIOS) for a startup process performed by the CPU 40 when the PC 4 is booted up. The RAM 42 is used as a storage area when the CPU 40 performs a variety of processes. The HDD 43 stores an operating system or a browser program for viewing web pages. The network interface 44 interfaces the CPU 40 with the router 21.

The PC 4 also comprises a video interface 45 and an input interface 46. The video interface 45 displays images based on instructions from the CPU 40 on a display (not shown) connected to the PC 4. The input interface 46 applies an input signal from a keyboard (not shown), a mouse (not shown), or the like connected to the PC 4 to the CPU 40.

These components of the PC 4 are connected to each other via a signal bus B2.

Figure 4:
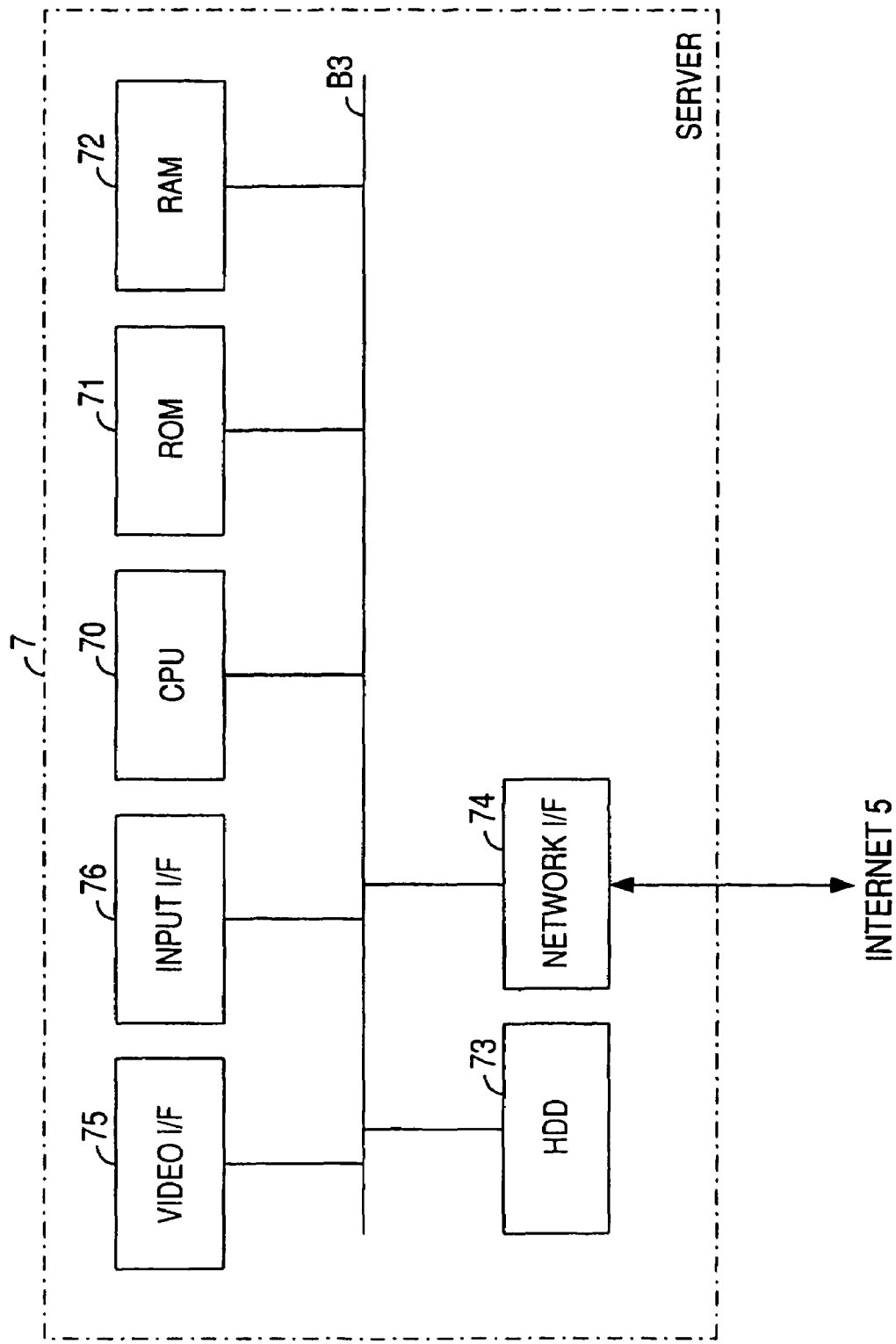
FIG. 4 is an electrical block diagram of a server in the remote diagnosis system of FIG. 1.

FIG. 4 is an electrical block diagram of the server 7.

As shown in FIG. 4, the server 7 comprises a CPU 70, a ROM 71, a RAM 72, an HDD 73, and a network interface 74. The CPU 70 performs a variety of processes of the server 7. The ROM 71 stores a program (BIOS) for a startup process performed by the CPU 70 when the server 7 is booted up. The RAM 72 is used as a storage area when the CPU 70 performs a variety of processes. The HDD 73 stores an operating system, a server program for allowing the server 7 to function as a web server, a variety of web page data (data in HTML format in the present aspect), filters which will be described later, a database (hereinafter, referred to as "DB" for short) which will be described later, or the like. The network interface 74 interfaces the CPU 70 with the internet 5.

The server 7 also comprises a video interface 75 and an input interface 76. The video interface 75 displays images based on instructions from the CPU 70 on a display (not shown) connected to the server 7. The input interface 76 applies an input signal from a keyboard (not shown), a mouse (not shown), or the like connected to the server 7 to the CPU 70.

These components of the server 7 are connected to each other via a signal bus B3.

Processes associated with the present invention, from among a variety of processes performed by the CPU 35 of the multifunction device 3, the CPU 40 of the PC 4, and the CPU 70 of the server 7, will now be described with reference to the drawings.

First, the CPU 40 of the PC 4 runs a browser program and gains access to the server 7 according to an instruction from the user. The CPU 40 of the PC 4 then receives data of a top page (written in Japanese) of a web site transmitted from the server 7 and displays this top page on the display of the PC 4. If the user selects a different language (English in this aspect) from a "language selection" menu, which is one of a variety of items displayed on the top page, the CPU 40 of the PC 4 notifies the server 7 of the selected language and receives data of a top page written in the selected language, which is transmitted from the server in response to the notification, and then displays this top page on the display of the PC 4.

When the user selects an item "diagnosis guidance page" from the variety of items displayed on the top page, the CPU 40 of the PC 4 transmits a diagnosis guidance page transmission request to the server 7 and receives data of a diagnosis guidance page written in the selected language, which is transmitted from the server 7, and then displays this diagnosis guidance page on the display of the PC 4. Then, when the user selects an item "diagnostic program download" from a variety of items displayed or the diagnosis guidance page, the CPU 40 of the PC 4 transmits a diagnostic program transmission request to the server 7 and downloads a diagnostic program, which includes a Java™ applet, and text data of a message indicating start of diagnosis, written in the selected language, from the server 7.

Upon completion of the download of the diagnostic program and the text data, the CPU 40 of the PC 4 runs the diagnostic program and displays the message indicating start of diagnosis on the display of the PC 4, and then performs a diagnosis process that is described below.

Figure 5:
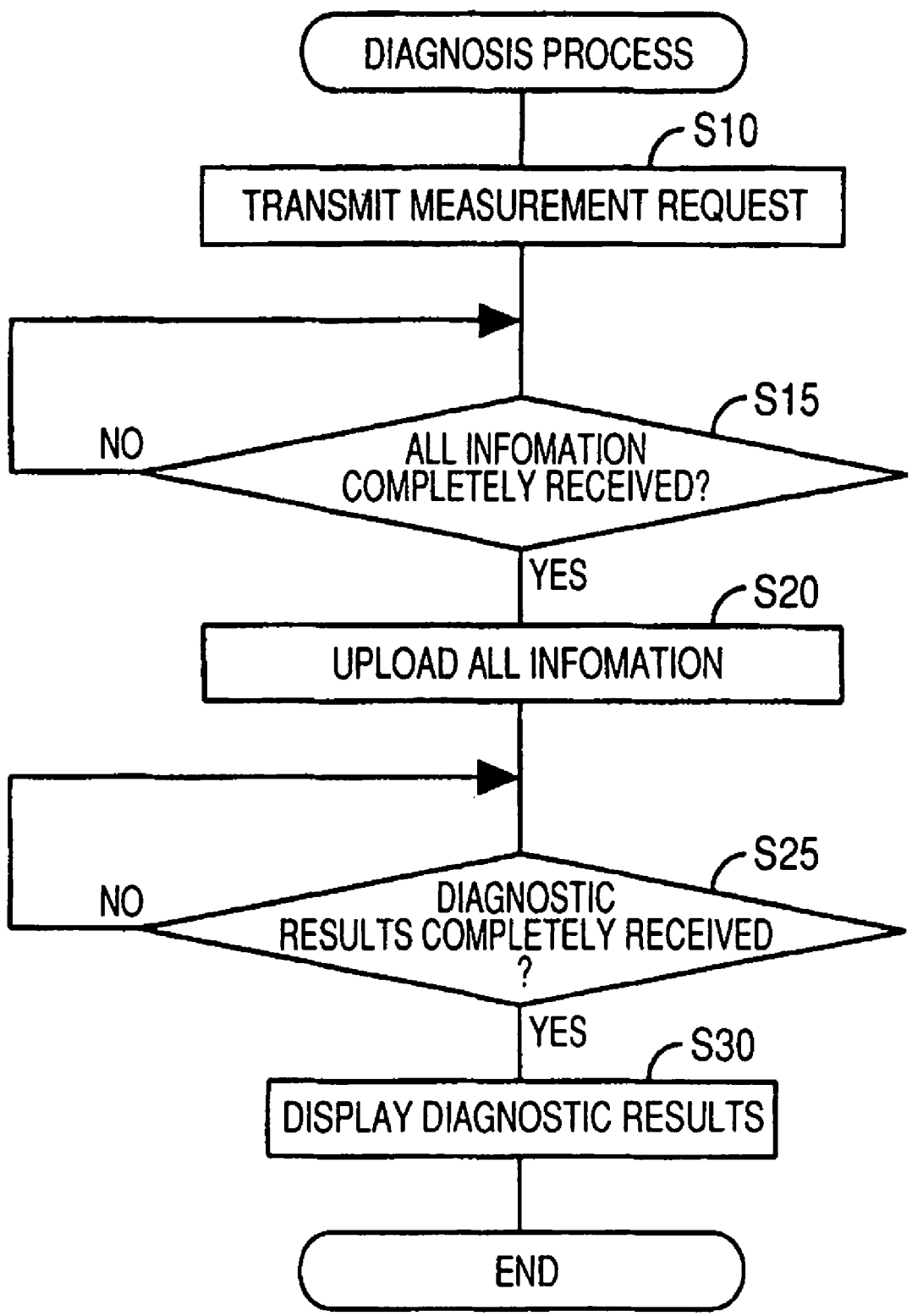
FIG. 5 is a flow chart of a diagnosis process performed by a CPU of the PC.

FIG. 5 is a flow chart of a diagnosis process performed by the CPU 40 of the PC 4.

As shown in FIG. 5, first, the CPU 40 of the PC 4 transmits a measurement request, which requests transmission of product information, measurement of a variety of measurement items set in the diagnostic program, and transmission of measurement results of the measurement items, to the multifunction device 3 (S10), and waits until reception of all information transmitted from the multifunction device 3, including the product information and the variety of measurement results, is completed (S15).

When the reception of all the information is completed (Yes at S15), the CPU 40 of the PC 4 uploads all the received information to the server 7 (S20) and waits until reception of diagnostic results from the server 7 is completed (S25).

When the reception of the diagnostic results is completed (Yes at S25), the CPU 40 of the PC 4 displays the received diagnostic results on its display (S30) and terminates the diagnosis process.

Figure 6:
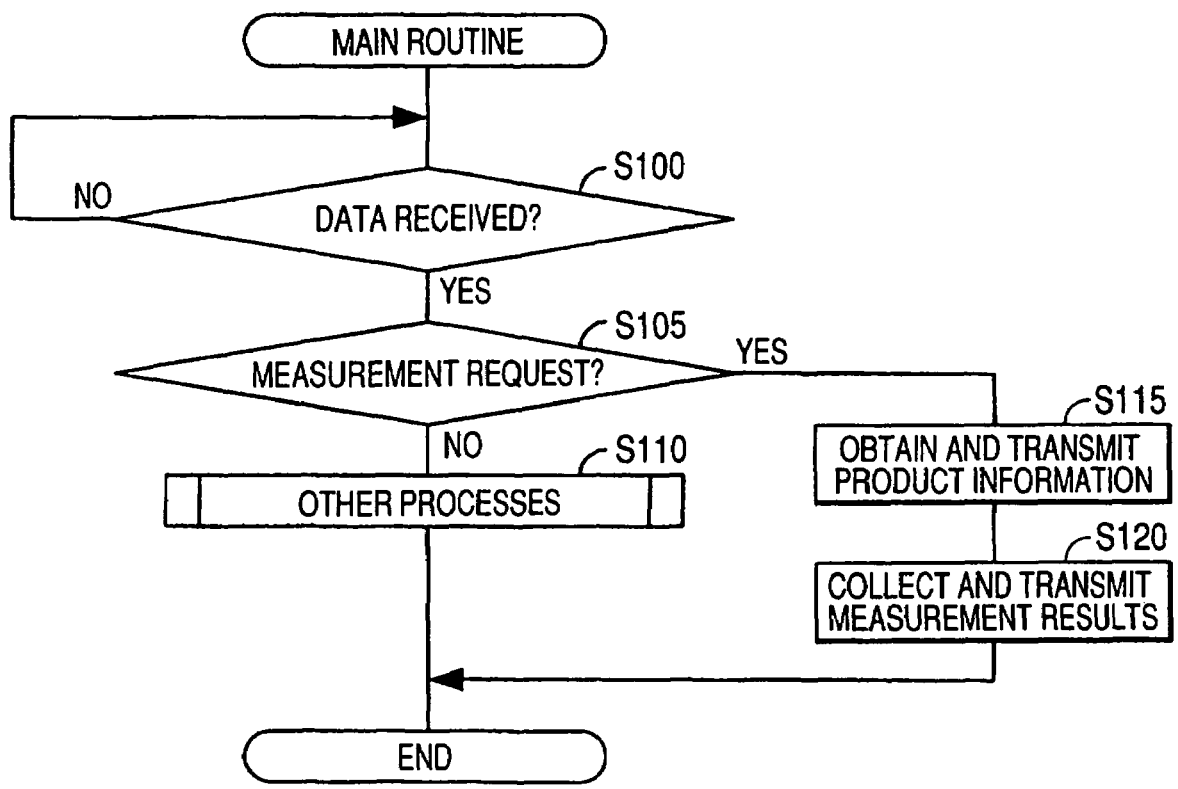
FIG. 6 is a flow chart of a main routine performed by a CPU of the multifunction device.

FIG. 6 is a flow chart of a main routine performed by the CPU 35 of the multifunction device 3. This process is repeatedly performed.

As shown in FIG. 6, in this process, first, the CPU 35 of the multifunction device 3 waits until data is received from the PC 4 (S100). When receiving data (Yes at S100), the CPU 35 of the multifunction device 3 determines whether or not the received data is a measurement request (S105).

When the CPU 35 of the multifunction device 3 determines that the received data is not a measurement request (No at S105), the CPU 35 performs other processes (for example, printing) according to the received data (for example, print data) (S110), and terminates the process of FIG. 6.

On the other hand, when the CPU 35 of the multifunction device 3 determines that the received data is a measurement request (Yes at S105), the CPU 35 obtains product information from the ROM 36 and transmits the product information to the PC 4 (S115). The CPU 35 of the multifunction device 3 collects measurement values indicating states of the components of the multifunction device 3, as measurement results, from the nonvolatile memory 38 or sensors installed on the components of the multifunction device 3 according to the measurement items in the measurement request, and transmits the measurement results to the PC 4 (S120), and then terminates the process of FIG. 6. More specifically, the CPU 35 of the multifunction device 3 transmits model information, destination information, a product number, and a variety of measurements (the amount of ink used, the number of pages printed, and the like), together with IDs corresponding respectively to these values, to the PC 4 (see FIG. 7). In the, a variety of measurement items of all types of multifunction devices are set in the diagnostic program, and, when a measurement item not associated with the multifunction device 3 is included in the variety of measurement items, the CPU 35 of the multifunction device 3 transmits an error indicating that there is no corresponding measurement result, together with an ID corresponding to the measurement item, to the PC 4.

Figure 8:
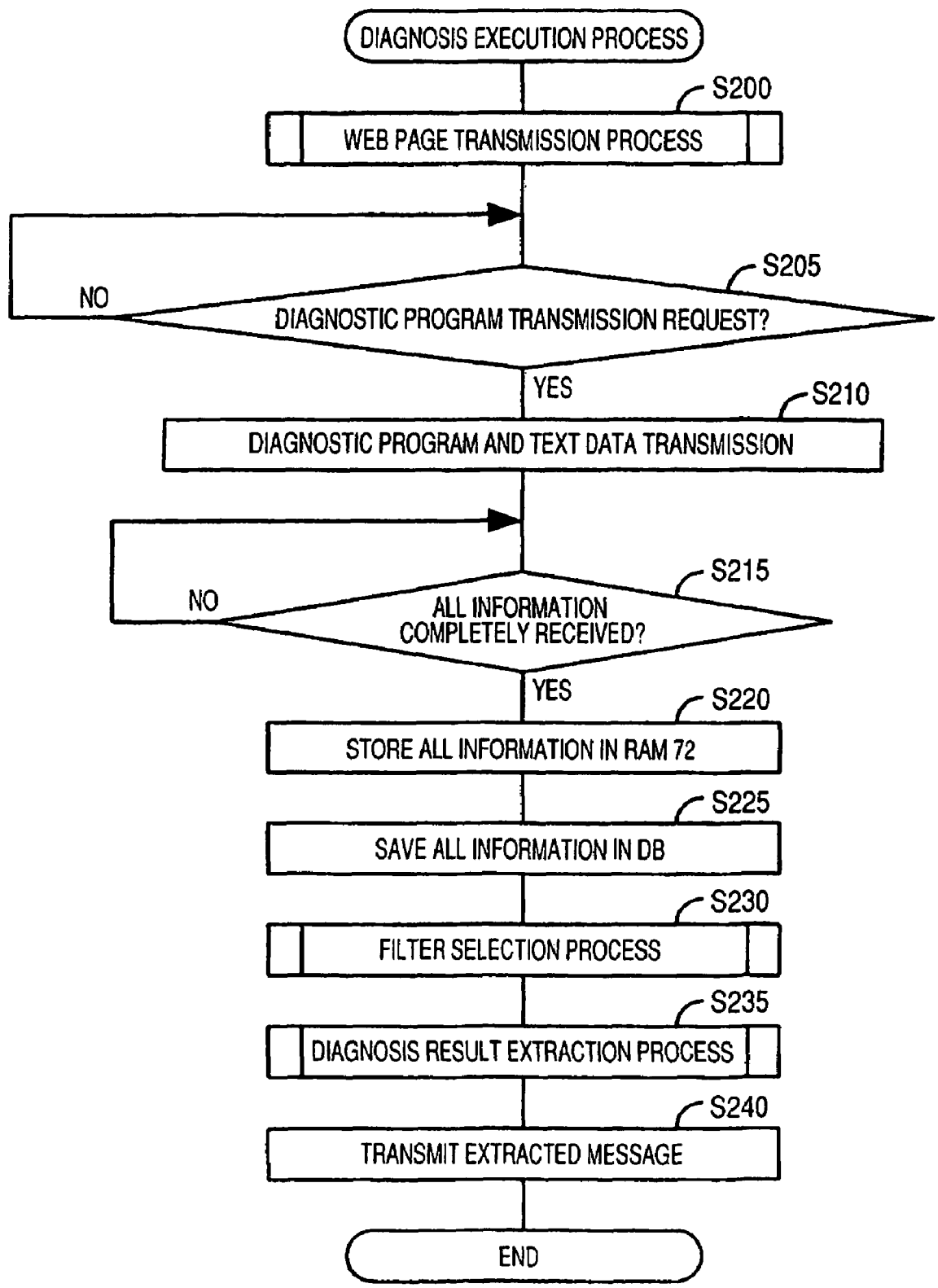
FIG. 8 is a flow chart of a diagnosis execution process performed by a CPU of the server.

FIG. 8 is a flow chart of a diagnosis execution process performed by the CPU 70 of the server 7. The CPU 70 performs this process when it is accessed by the PC 4.

As shown in FIG. 8, in the diagnosis execution process, first, the CPU 70 of the server 7 performs a process for transmitting a preset web page (S200).

In this web page transmission process, when the CPU 70 of the server 7 is notified by the PC 4 that a different language is selected after obtaining data of a top page written in Japanese from the HDD 73 and transmitting the top page data to the PC 4, the CPU 70 stores the selected language in the RAM 72 and also obtains data of a top page written in the selected language from the HDD 73 and transmits the top page data to the PC 4. In initial setting, information indicating that Japanese is selected is set in the RAM 72. When receiving a diagnosis guidance page transmission request from the PC 4, the CPU 7 of the server 70 obtains data of a diagnosis guidance page written in a language stored in the RAM 72 from the HDD 73 and transmits the diagnosis guidance page data to the PC 4.

When performing and terminating the web page transmission process in this manner, the CPU 70 of the server 7 waits until a diagnostic program transmission request is received from the PC 4 (S205). When a diagnostic program transmission request is received (Yes at S205), the CPU 70 of the server 7 obtains a diagnostic program and text data written in a language stored in the RAM 72 from the HDD 73 and transmits the diagnostic program and the text data to the PC 4 (S210).

The CPU 70 of the server 7 waits until reception of all information transmitted from the PC 4 is completed (S215). When the reception of all the information is completed (Yes at S215), the CPU 70 stores all the received information in the RAM 72 (S220) and also saves all the received information a DB set in the HDD 73 (S225).

Then, the CPU 70 of the server 7 selects a filter, which corresponds to model information and destination information of a multifunction device to be diagnosed, from among a group of filters including a plurality of types of filters F1-Fn ("n" is an integer greater than 1) set in the HDD 73, and performs a filter selection process, described below, in which data of the selected filter is read into the RAM 72 (S230).

More specifically, the filters F1-Fn respectively include a plurality of tables, which are set in the HDD 73 respectively for a plurality of model information or destination information (see FIGS. 9, 10, 11, and 12). In each of the tables, IDs of measurement items according to model or destination information (i.e., IDs of measurement items corresponding to a multifunction device to be diagnosed) are associated respectively with both determination conditions of diagnostic results for measurement results of the measurement items and messages of the diagnostic results. In the filters F1-Fn, both messages written in English and messages written in Japanese are set for the same diagnosis result. The messages include messages M1 indicating diagnostic items and messages M2 indicating diagnostic results.

A plurality of types of reference filters (see FIG. 13), in which special messages, etc., for specific customers are set, is set in the HDD 73, separately from the filters F1-Fn. A link to a reference filter is set in some of the filters F1-Fn, for example, in the filter F1 (see FIG. 12).

When performing and terminating the filter selection process, the CPU 70 of the server 7 performs, with reference to the filters read into the RAM 72, a diagnosis result extraction process in which messages corresponding respectively to measurement results are extracted from all the information stored in the RAM 72 (S235). The CPU 70 of the server 7 transmits the extracted messages, as diagnostic results, to the PC 4 (S240) and terminates the diagnosis execution process of FIG. 8. Here, the CPU 70 of the server 7 transmits the messages M1 and the messages M2 to the PC 4, while associating the messages M1 respectively with the messages M2. The CPU 40 of the PC 4 displays the messages M1 and the messages M2 in the same table, while associating the messages M1 respectively with the messages M2 (see FIG. 14A). When a message M1 includes a symbol ( - - - in this example) for dividing the table, the CPU 40 of the PC 4 displays messages M1 and messages M2, subsequent to the message M1, in a different table, while associating the messages M1 respectively with the messages M2. When a certain message M2 is blank, the CPU 40 of the PC 4 displays a message M1 corresponding to the message M2, as a header, in the table. When a certain message M1 is blank, the CPU 40 of the PC 4 displays a message M2 corresponding to the message M1, as a warning message, in a different frame (see FIGS. 14B and 14C).

Figure 15:
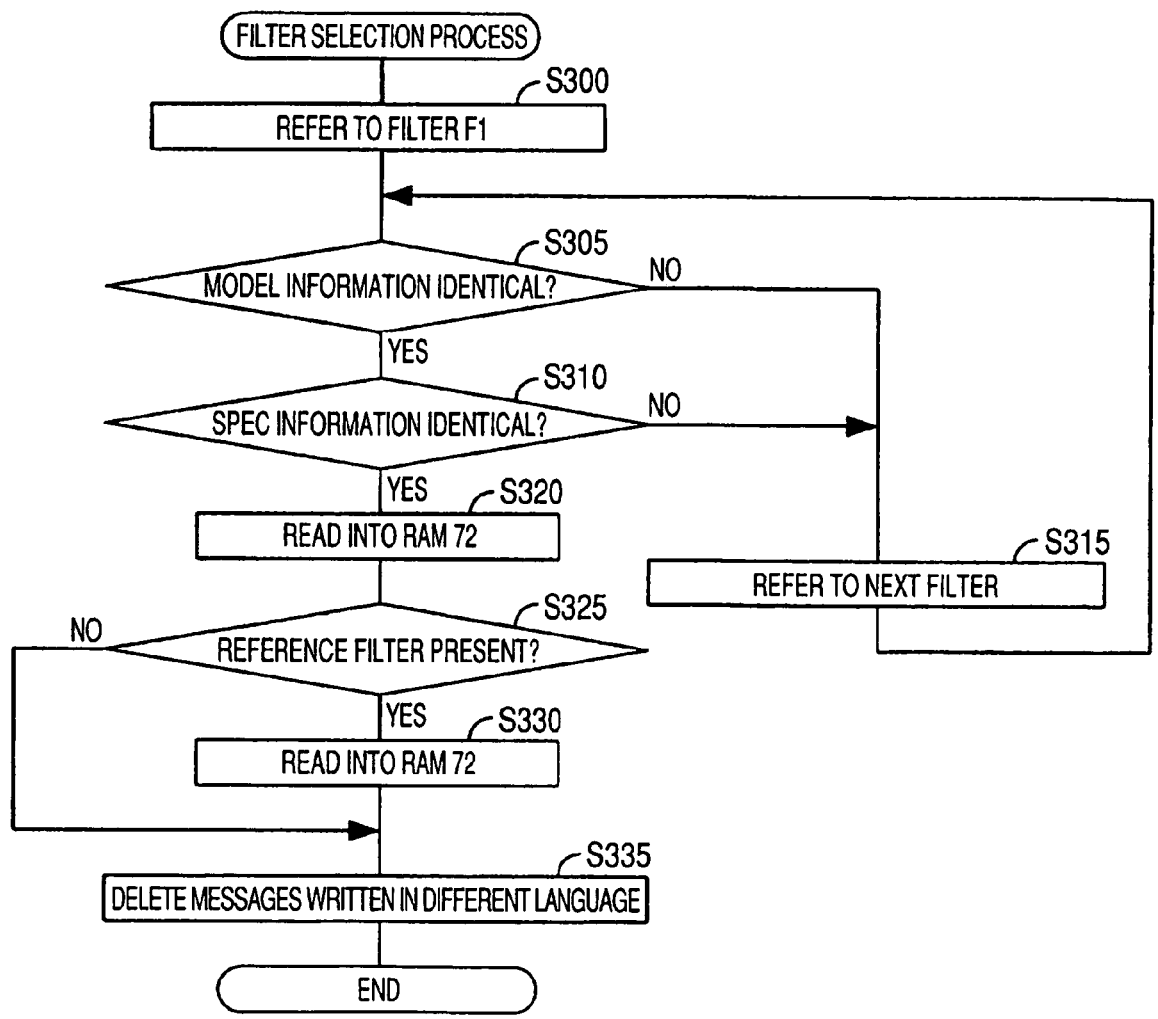
FIG. 15 is a flow chart of a filter selection process performed by the CPU of the server.

FIG. 15 is a flow chart of the filter selection process (S230) described above.

As shown in FIG. 15, in the filter selection process, first, the CPU 70 of the server 7 refers to a first filter F1 in the filter group (S300) and determines whether or not model information set in the filter referred to is identical to model information stored in the RAM 72 (S305).

If the CPU 70 of the server 7 determines that the two model information are not identical (No at S305), the CPU 70 proceeds to step S315 described below. If the CPU 70 determines that the two model information are identical (Yes at S305), the CPU 70 determines whether or not destination information set in the filter referred to is identical to destination information stored in the RAM 72 (S310).

If the CPU 70 of the server 7 determines that the two destination information are not identical (No at S310), the CPU 70 refers to the subsequent filter (i.e., in the order of Filter F2→Filter F3→ . . . →Filter Fn) (S315), and returns to the above step S305. If the CPU 70 determines that the two destination information are identical (Yes at S310), the CPU 70 reads data of the filter into the RAM 72 (S320).

The CPU 70 of the server 7 checks whether or not a link to a reference filter is set in the filter (S325). If a link to a reference filter is not set in the filter (No at S325), the CPU 70 proceeds directly to step S335 described below. If a link to a reference filter is set in the filter (Yes at S325), the CPU 70 also reads data of the linked reference filter into the RAM 72 (S330). Here, if a plurality of links to reference filters is set in the filter, the CPU 70 reads data of all the linked reference filters into the RAM 72.

Then, the CPU 70 of the server 7 refers to a language stored in the RAM 72 and deletes messages written in a different language from the stored language from the RAM 72 (S335) and terminates the filter selection process of FIG. 15.

Figure 16:
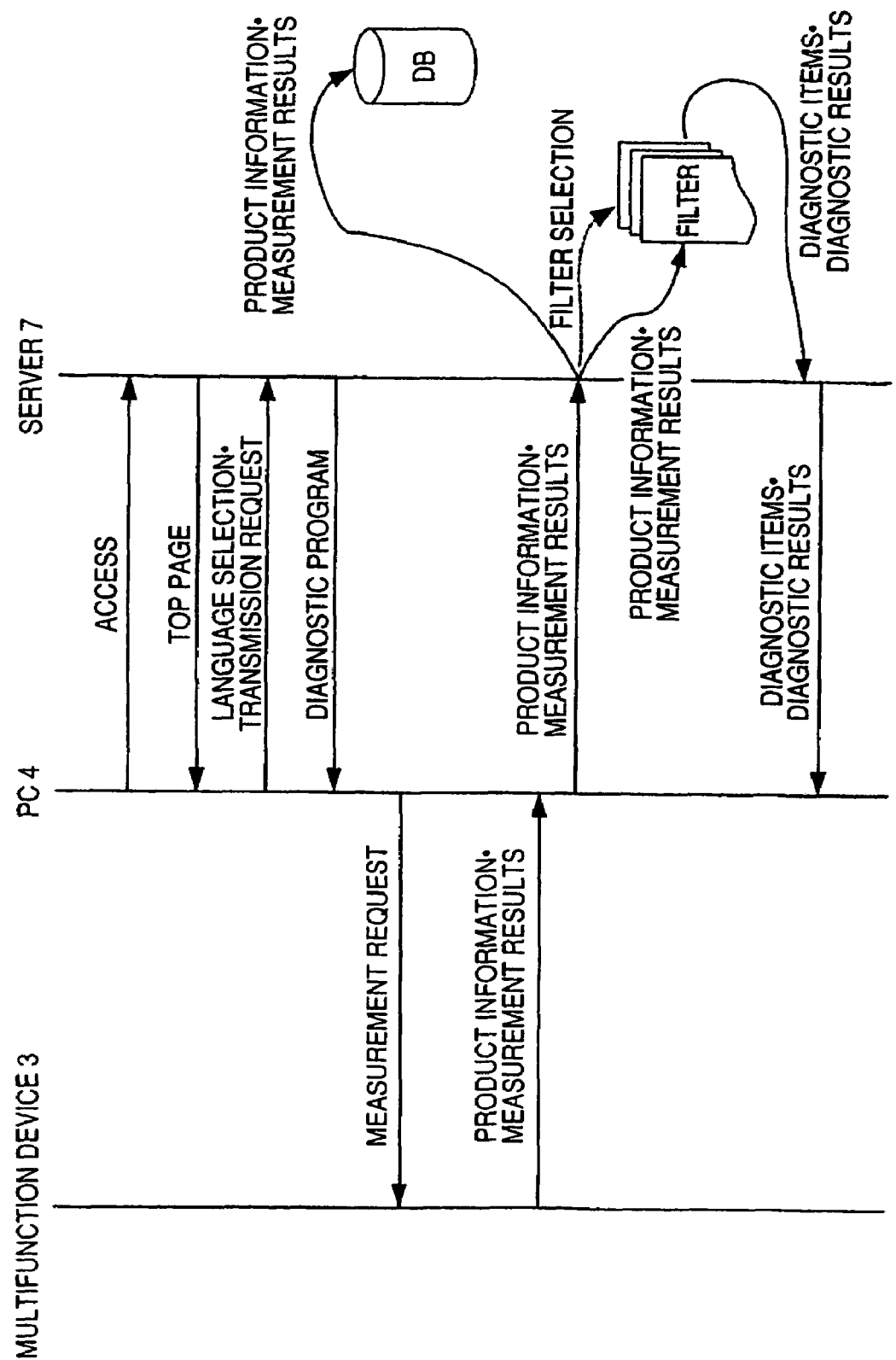
FIG. 16 is a sequence diagram briefly illustrating the flow of processes of a remote diagnosis system.

In other words, the remote diagnosis system 1 operates in the following manner; As shown in FIG. 16, first, when the PC 4 gains access to the server 7, the server 7 transmits a top page to the PC 4, and the PC 4 displays the top page received from the server 7 on its display. When the PC 4 transmits a diagnostic program transmission request to the server 7 after notifying the server 7 of a selected language, the server 7 transmits a diagnostic program A to the PC 4.

When the PC 4 transmits a measurement request to the multifunction device 3 according to the diagnostic program downloaded from the server 7, the multifunction device 3 collects measurement results corresponding to measurement items of all types of multifunction devices, and transmits the collected measurement results, together with product information, to the PC 4, and the PC 4 then transmits the product information and measurement results received from the multifunction device 3 to the server 7.

The server 7 saves the product information and measurement results received from the PC 4 in a DB, and selects a filter from a group of filters according to the received product information. The server 7 extracts diagnostic items and diagnostic results for transmission to the PC 4 based on both setting information of the selected filter and the received measurement results, and transmits the extracted diagnostic items and results to the PC 4. FIG. 16 is a sequence diagram briefly illustrating the flow of processes of the remote diagnosis system 1.

The server 7 determines diagnostic items and determination conditions of the diagnostic results for transmission to the PC 4 using a filter according to the characteristics of the multifunction device 3, so that the server can appropriately diagnose the multifunction device and can also appropriately notify the PC of the diagnostic results without individually providing programs for diagnosing multifunction devices according to the characteristics of the multifunction devices.

In addition, in the remote diagnosis system 1, the server 7 transmits diagnostic items and diagnostic results written in a language selected by the user to the PC 4, so that the PC 4 can display the diagnostic items and the diagnostic results in the language selected by the user.

Further, the multifunction device 3 functions as a terminal device, the PC 4 functions as a management device, and the server 7 functions as a remote diagnosis device.

In addition, the selected language for notification and the product information function as characteristics data, and the network interface 74 of the server 7 and steps S200 and S215 of the diagnosis execution process performed by the CPU 70 of the server 7 function as a first obtaining unit.

Also, the network interface 74 of the server 7 and step S215 of the diagnosis execution process performed by the CPU 70 of the server 7 function as a second obtaining unit, and the filters F1-Fn function as filters and a group of filters.

Further, steps S300-S320 of the filter selection process performed by the CPU 70 of the server 7 function as a filter selection unit, and steps S235 and S240 of the diagnosis execution process performed by the CPU 70 of the server 7 and step S335 of the filter selection process function as a diagnosis result transmission unit.

Another aspect of the present invention will now be described. Only part of the flows of processes performed by a CPU 40 of a PC 4, a CPU 35 of a multifunction device 3, and a CPU 70 of the server 7 in a remote diagnosis system 1 is different from those of the first aspect, and the remaining part of the second aspect is the same as the first aspect. A description of the same part of the second embodiment as the first embodiment is omitted herein and only the different part thereof from the first embodiment will be described.

First, the CPU 40 of the PC 4 in the second aspect transmits a diagnostic program transmission request to the server 7 in the same manner as in the first aspect. The CPU 40 then downloads, from the server 7, both a diagnostic program A including a Java™ applet and text data of a message indicating transmission of product information to the server 7, written in a selected language, instead of the diagnostic program and the text data in the first aspect. When the download of the diagnostic program A and the text data is completed, the CPU 40 of the PC 4 runs the diagnostic program A and displays the message indicating transmission of product information to the server 7 on a display of the PC 4, and then performs a diagnosis process that is described below.

Figure 17:
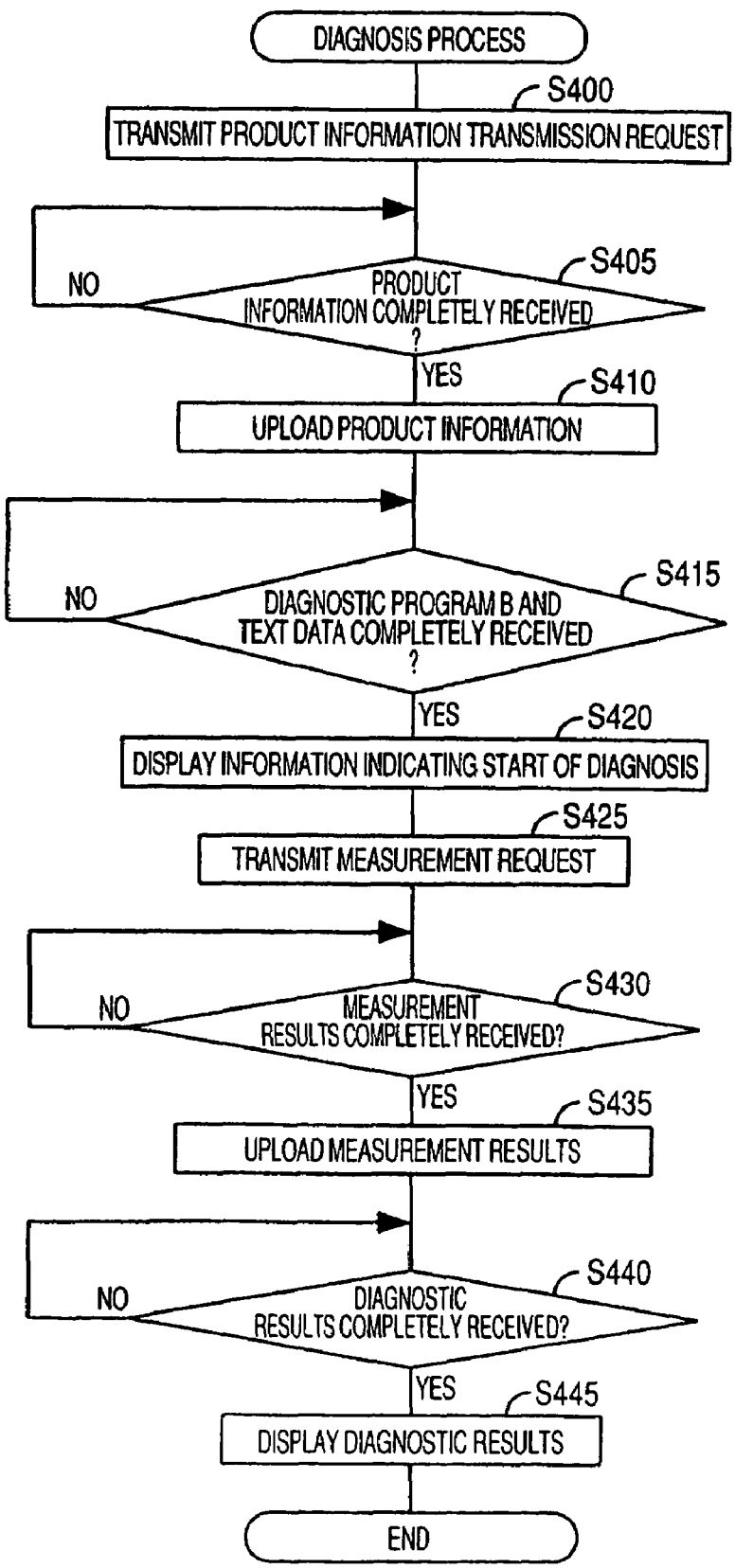
FIG. 17 is a flow chart of a diagnosis process performed by the CPU of the PC.

FIG. 17 is a flow chart of a diagnosis process performed by the CPU 40 of the PC 4 in the second aspect.

As shown in FIG. 17, first, the CPU 40 of the PC 4 transmits a product information transmission request to the multifunction device 3 (S400), and waits until reception of product information is completed (S405).

When the reception of the product information is completed (Yes at S405), the CPU 40 of the PC 4 uploads the received product information to the server 7 (S410) and waits until both a diagnostic program B, in which measurement items for measurement by the multifunction device 3 are set, and text data of a message indicating start of diagnosis written in the selected language is completed (S415).

When download of the program B and the text data is completed (Yes at S415), the CPU 40 of the PC 4 displays the message indicating start of diagnosis on the display of the PC 4 (S420) and transmits a measurement request, which requests measurement of a variety of measurement items set in the diagnostic program B and transmission of measurement results of the measurement items, to the multifunction device 3 (S425), and waits until reception of the measurement results is completed (S430), When reception of the measurement results is completed (Yes at S430), the CPU of the PC 4 uploads the received measurement results to the server 7 (S435) and performs the same processes as steps S25 and S30 in the diagnosis process of the first aspect (S445 and S450), and then terminates the diagnosis process of FIG. 17.

Figure 18:
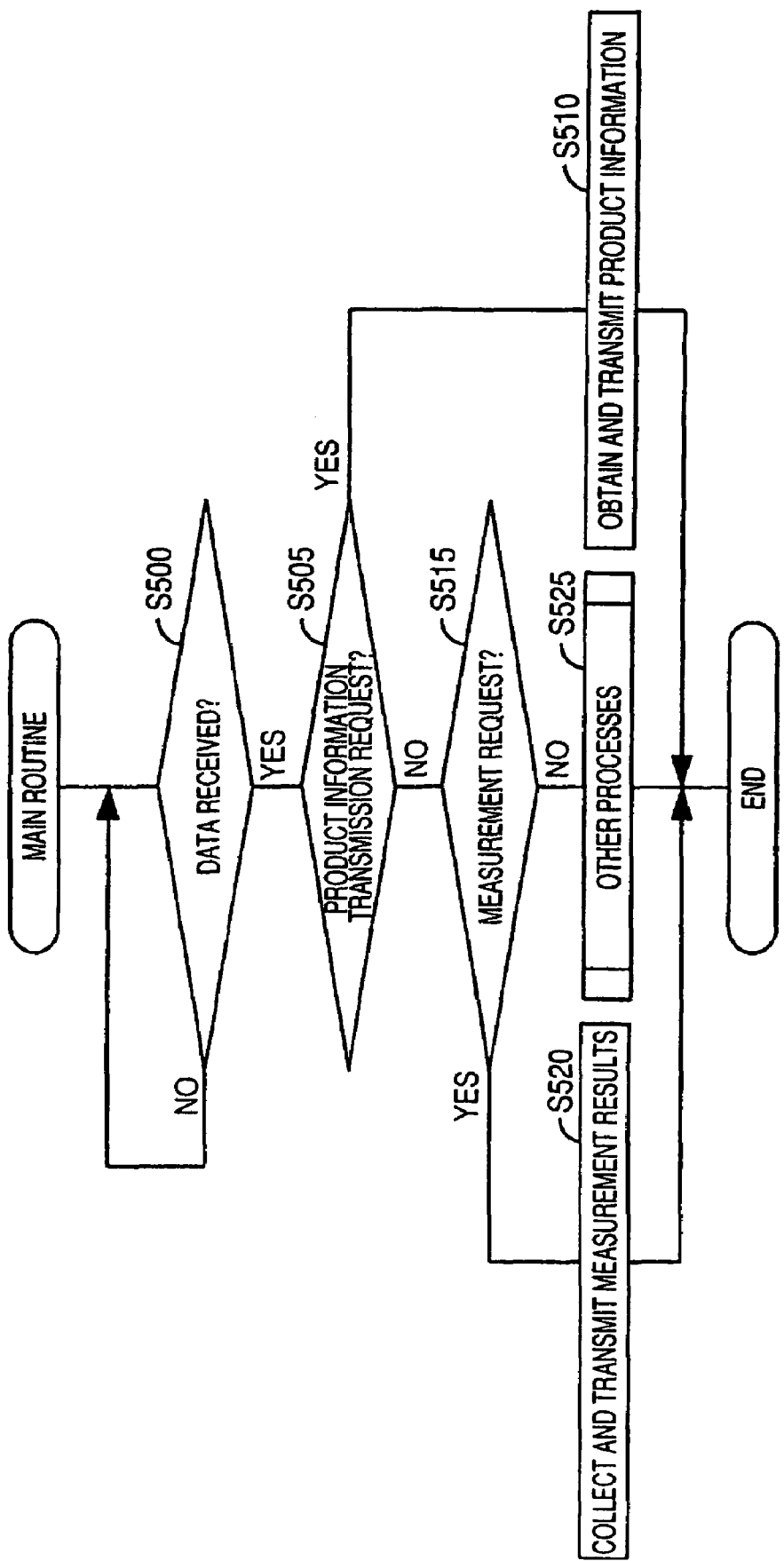
FIG. 18 is a flow chart of a main routine performed by a CPU of the multifunction device.

FIG. 18 is a flow chart of a main routine performed by the CPU 35 of the multifunction device 3 in the second aspect.

As shown in FIG. 18, in this process, first, the CPU 35 of the multifunction device 3 performs the same process as step S100 in the main routine of the first aspect (S500), and then determines whether or not the received data is a product information transmission request (S505).

When the CPU 35 of the multifunction device 3 determines that the received data is a product information transmission request (Yes at S505), the CPU 35 performs the same process as step S115 of the main routine of the first aspect (S510), and terminates the process of FIG. 18.

On the other hand, when the CPU 35 of the multifunction device 3 determines that the received data is not a product information transmission request (No at S505), the CPU 35 determines whether or not the received data is a measurement request (S515). When the CPU 35 of the multifunction device 3 determines that the received data is a measurement request (Yes at S515), the CPU 35 performs the same process as step S120 in the main routine of the first aspect (S520) and terminates the process of FIG. 18

On the other hand, when the CPU 35 of the multifunction device 3 determines that the received data is not a measurement request (No at S515), the CPU 35 performs the same process as step S110 in the main routine of the first aspect (S525) and terminates the process of FIG. 18.

Figure 19:
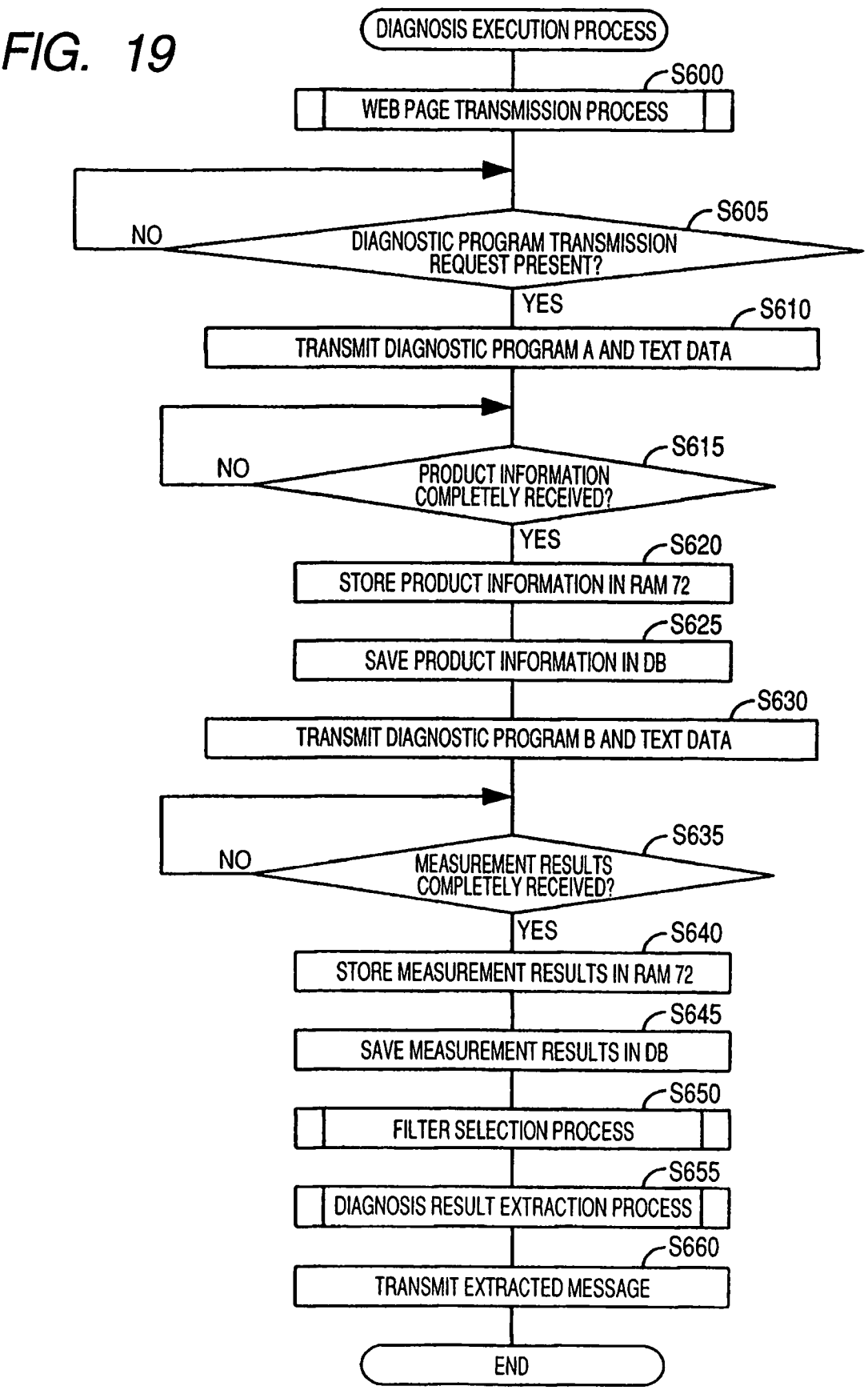
FIG. 19 is a flow chart of a diagnosis execution process performed by the CPU of the server.

FIG. 19 is a flow chart of a diagnosis execution process performed by the CPU 70 of the server 7 in the second aspect.

As shown in FIG. 19, in the diagnosis execution process, first, the CPU 70 of the server 7 performs the same processes as steps S200 and S205 in the diagnosis execution process of the first aspect (S600 and S605), and then obtains a diagnostic program A and text data written in a language stored in the RAM 72 from the HDD 73 and transmits the diagnostic program A and the text data to the PC 4 (S610).

The CPU 70 of the server 7 waits until reception of product information transmitted from the PC 4 is completed (S615). When the reception of product information is completed (Yes at S615), the CPU 70 of the server 7 stores the received product information in the RAM 72 (S620) and also saves the received product information in a DB set in the HDD 73 (S625).

The CPU 70 of the server 7 then obtains a diagnostic program B corresponding to the received product information and text data written in the language stored in the RAM 72 from the HDD 73 and transmits the obtained text data and diagnostic program to the PC 4 (S630). Here, in the HDD 73 of this aspect, diagnostic programs B are set to be associated respectively with groups, into which multifunction devices are classified by model, and measurement items according to each model are set in a corresponding one of the diagnostic programs.

The CPU 70 of the server 7 waits until reception of measurement results transmitted from the PC 4 is completed (S635), and then stores the received measurement results in the RAM 72 (S640) and also saves the received measurement results in a DB set in the HDD 73, while associating the received measurement results with respective product information (i.e., saves the received measurement results for each multifunction device) (S645). The CPU 70 of the server 7 then performs the same processes as steps S230-S240 in the diagnosis execution process of the first aspect (S650-S660) and terminates the diagnosis execution process of FIG. 19.

Figure 20:
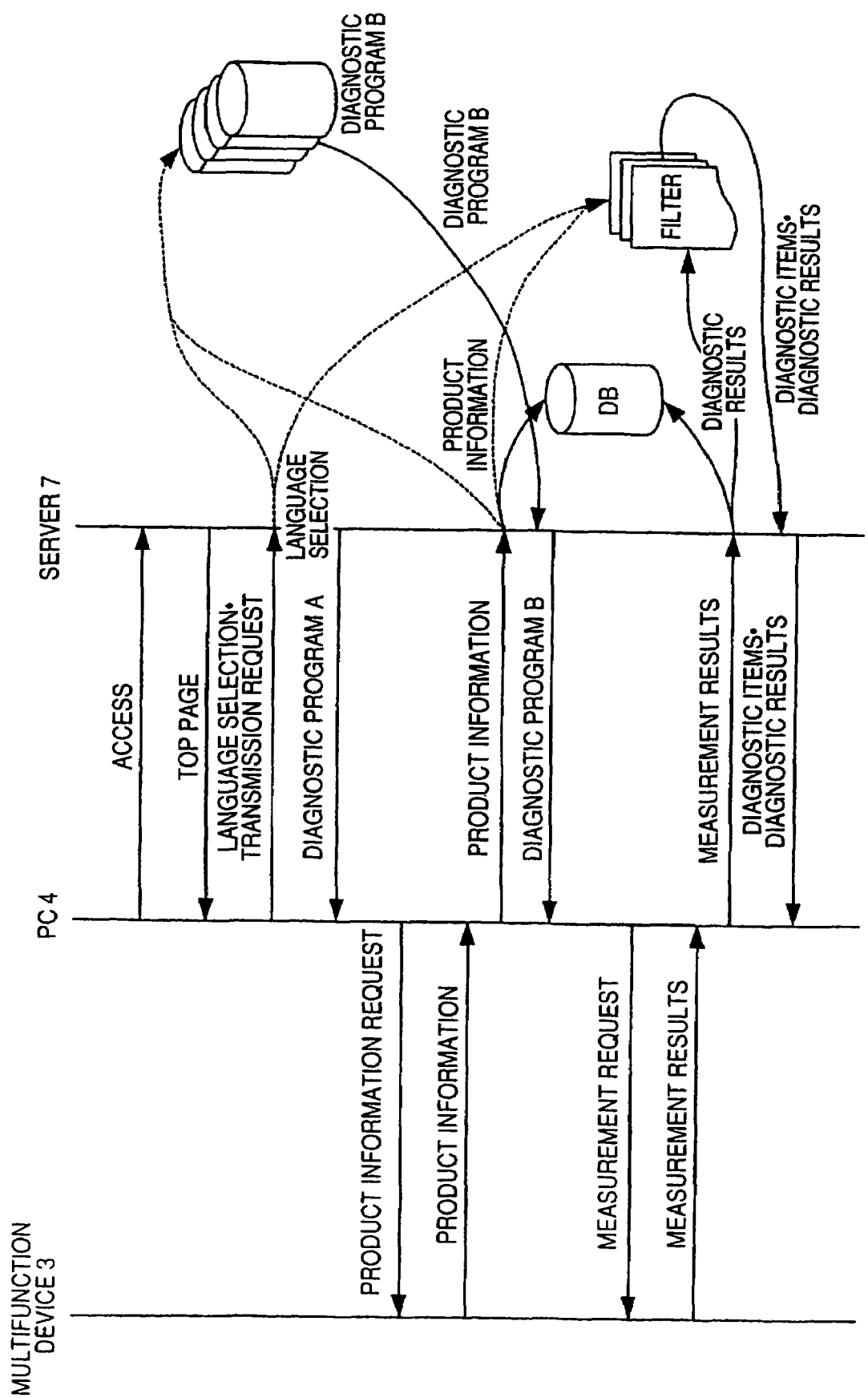
FIG. 20 is a sequence diagram briefly illustrating the flow of processes of a remote diagnosis system.

In other words, the remote diagnosis system 1 of the second aspect operates in the following manner. As shown in FIG. 20, first, when the PC 4 gains access to the server 7, the server 7 transmits a top page to the PC 4, and the PC 4 displays the received top page on its display. When the PC 4 transmits a diagnostic program transmission request to the server 7 after notifying the server 7 of a selected language A, the server 7 transmits a diagnostic program to the PC 4.

When the PC 4 transmits a product information transmission request to the multifunction device 3 according to the diagnostic program A downloaded from the server 7, the multifunction device 3 obtains and transmits product information to the PC 4, and the PC 4 transmits the product information received from the multifunction device 3 to the server 7.

The server 7 saves the product information received from the PC 4 in a DB, and also selects a diagnostic program B corresponding to the received product information and transmits the selected diagnostic program B to the PC 4. Then, when the PC 4 transmits a measurement request to the multifunction device 3 according to the diagnostic program B downloaded from the server 7, the multifunction device 3 collects measurement results corresponding to measurement items common to the model of the multifunction device 3 and transmits the collected measurement results to the PC 4.

The PC 4 transmits the measurement results received from the multifunction device 3 to the server 7. The server 7 saves the measurement results received from the PC 4 in a DB and selects a filter from a group of filters according to the received product information. The server 7 extracts diagnostic items and diagnostic results for transmission to the PC 4 based on both setting information of the selected filter and the received measurement results, and transmits the extracted diagnostic items and results to the PC 4. FIG. 20 is a sequence diagram briefly illustrating the flow of processes of the remote diagnosis system 1 of the second aspect.

The server 7 of the second aspect does not download measurement items unrelated to the multifunction device to be diagnosed, thereby reducing the time required to download a measurement result collection program (i.e., the diagnostic program B) and thus reducing the time required for the diagnosis.

In this aspect, the diagnostic program B functions as a collection program, the HDD 73 of the server 7 function as a program storage unit, and the network interface 74 of the server 7 and step 5630 of the diagnosis execution process performed by the CPU 70 of the server 7 function as a program transmission unit.

A third aspect of the present invention will now be described. Only part of filters set in an HDD 73 of a server 7 in a remote diagnosis system of the third aspect and part of the flow of a filter selection process performed by a CPU 70 of the server 7 is different from those of the first and second aspects, and the remaining part of the third aspect is the same as the second aspect. Thus, only the filters and the filter selection process are described herein.

The HDD 73 of the server 7 in the third aspect includes a plurality of types of filters, in each of which a function (Func) based on a past measurement result is set as a parameter in a determination condition (see FIG. 21).

Figure 22:
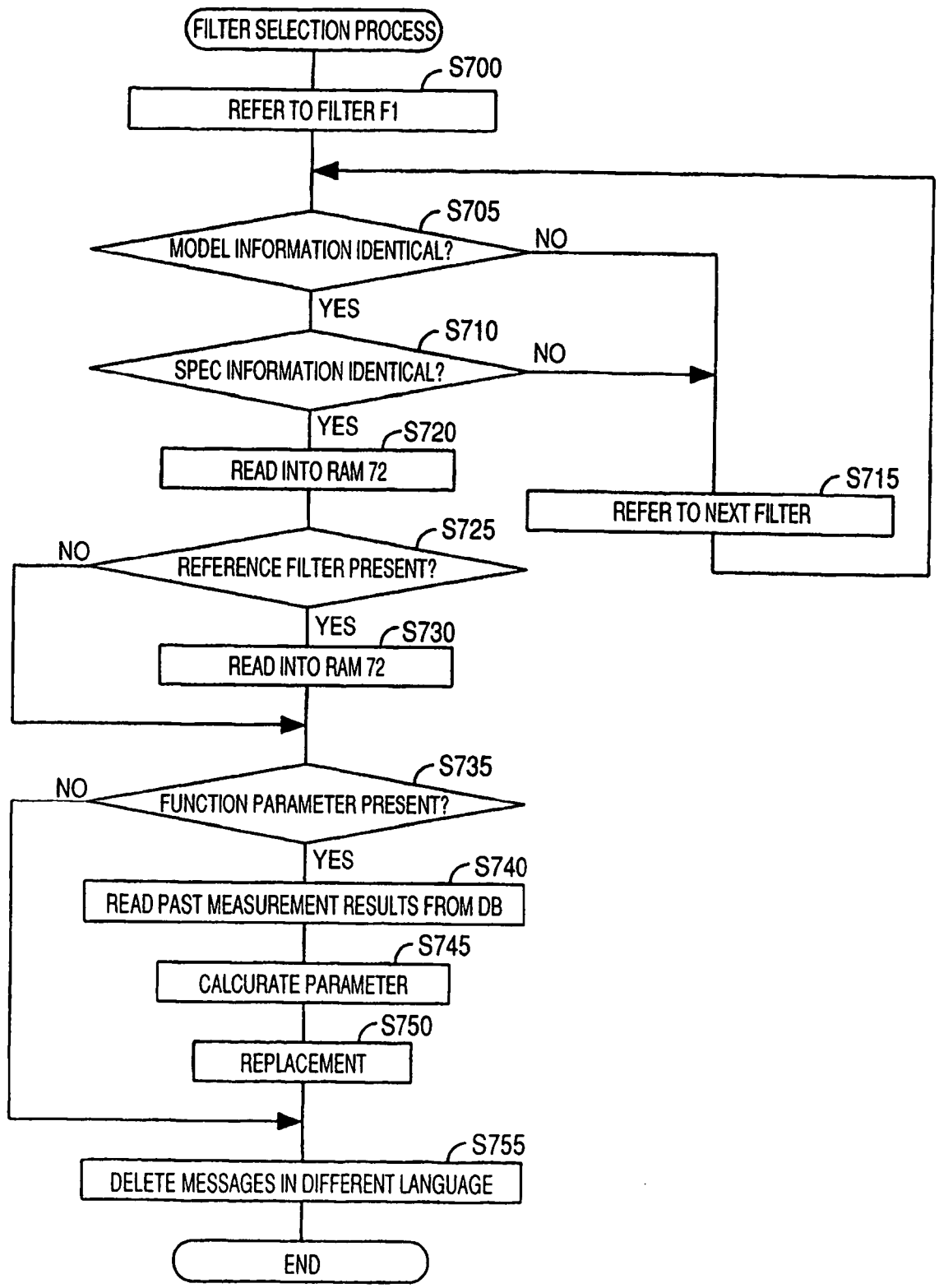
FIG. 22 is a flow chart of a filter selection process performed by the CPU of the server.

FIG. 22 is a flow chart of a filter selection process performed by the CPU 70 of the server 7 in the third aspect.

As shown in FIG. 22, in the filter selection process, first, the CPU 70 of the server 7 performs the same processes as steps S300-S330 of the filter selection process in the first and second aspects (S700-S730), and then checks whether or not a determination condition, in which a function based on a past measurement result is set as a parameter, is present in a filter read into the RAM 72 (S735).

When a determination condition in which such a function is set as a parameter is not present (No at S735), the CPU 70 of the server 7 proceeds directly to step S755. When a determination condition in which such a function is set as a parameter is present (Yes at S735), the CPU 70 of the server 7 reads a past measurement result of a corresponding measurement item from a DB (S740), and calculates a parameter based on the read past measurement result and the definition of the function (S745). The CPU 70 of the server 7 replaces the function of the determination condition in the filter read into the RAM 72 with the calculated parameter (S750). The CPU 70 then performs the same process as step S335 in the filter selection process of the first and second aspects (S755) and terminates the filter selection process of FIG. 22. When a plurality of determination conditions, in which such functions are set as parameters, is present, the CPU 70 of the server 7 calculates all parameters of the determination conditions and replaces the functions with the calculated parameters.

Figure 23:
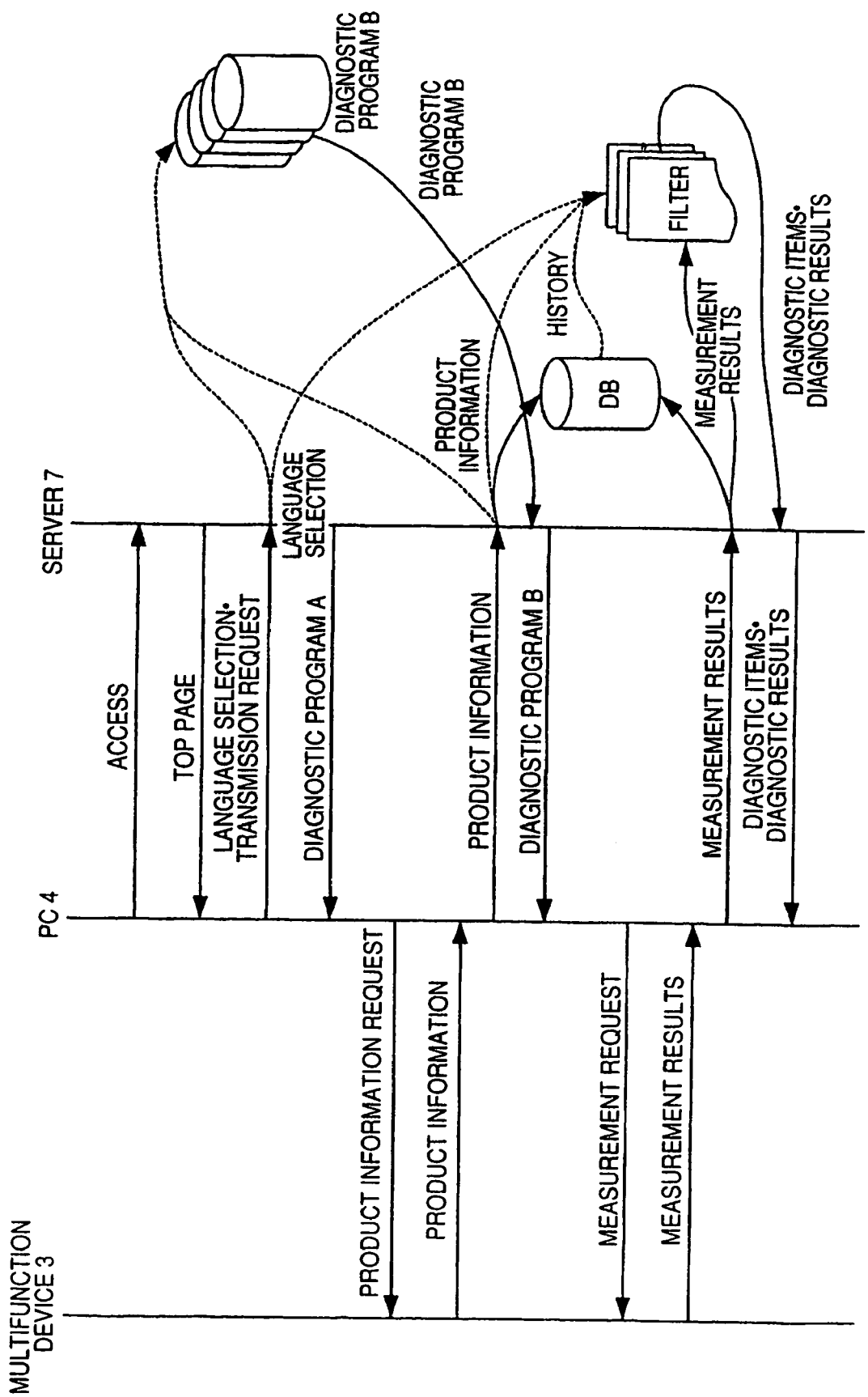
FIG. 23 is a sequence diagram briefly illustrating the flow of processes of a remote diagnosis system.

In other words, the remote diagnosis system 1 of the third aspect operates in the following manner. As shown in FIG. 23, first, when the PC 4 gains access to the server 7, the server 7 transmits a top page to the PC 4, and the PC 4 displays the received top page on its display. When the PC 4 transmits a diagnostic program transmission request to the server 7 after notifying the server 7 of a selected language, the server 7 transmits a diagnostic program A to the PC 4.

When the PC 4 transmits a product information transmission request to the multifunction device 3 according to the diagnostic program A downloaded from the server 7, the multifunction device 3 obtains and transmits product information to the PC 4, and the PC 4 transmits the product information received from the multifunction device 3 to the server 7.

The server 7 saves the product information received from the PC 4 in a DB, and also selects a diagnostic program B corresponding to the received product information and transmits the selected diagnostic program B to the PC 4. Then, when the PC 4 transmits a measurement request to the multifunction device 3 according to the diagnostic program B downloaded from the server 7, the multifunction device 3 collects measurement results corresponding to measurement items common to the model of the multifunction device 3 and transmits the collected measurement results to the PC 4.

The PC 4 transmits the measurement results received from the multifunction device 3 to the server 7. The server 7 saves the measurement results received from the PC 4 in a DB and selects a filter from a group of filters according to the received product information. Here, if a determination condition, in which a function based on a past measurement result is set as a parameter, is present in determination conditions in the selected filter, the server 7 calculates a parameter based on the past measurement result (history) and the definition of the function and replaces the function with the calculated parameter. The server 7 extracts diagnostic items and diagnostic results for transmission to the PC 4 based on setting information of the selected filter and the received measurement results, and transmits the extracted diagnostic items and results to the PC 4. FIG. 23 is a sequence diagram briefly illustrating the flow of processes of the remote diagnosis system 1 of the third aspect.

The server 7 of the third aspect can perform diagnosis based not only on the current measurement results but also on the past measurement results and thus can perform diagnosis taking into account changes over time, etc. It is also possible to predict the occurrence of a failure based on the past measurement results and thus to generate an alarm before a failure occurs.

Figure 24:
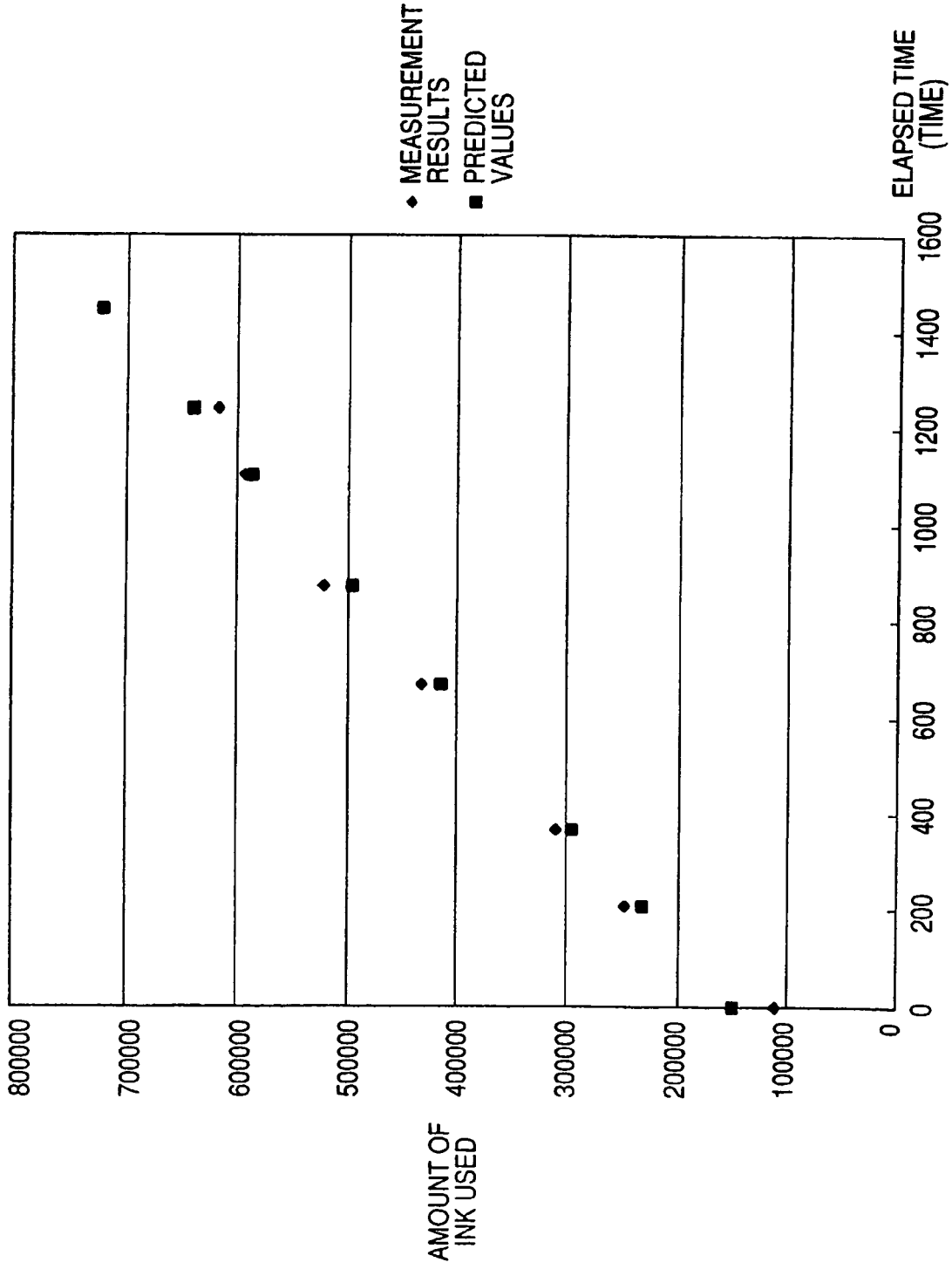
FIG. 24 is a graph illustrating an example of a linear regression analysis.

For example, the server 7 is set to record times when it is accessed by the PC 4, together with measurement results, in the DB. An average of the time intervals between access times of the PC 4 in the past is obtained, and a next access time is predicted. Linear regression analysis of the amount of ink used in the past is performed (see FIG. 24), and if the measurement result at the current access is at a certain level, a function for calculating whether or not the remaining amount of ink at the next access is short is set in the determination condition, which makes it possible to warn the user of the shortage of the remaining amount of ink in advance (see FIG. 25).

In this aspect, the HDD 73 of the server 7 and step S645 of the diagnosis execution process performed by the CPU 70 of the server 7 function as a storage unit, and steps S740-S750 of the filter selection process performed by the server 7 function as a change unit.

Although the present invention has been described with reference to the specific aspects, the present invention is not limited to the aspects, and various other aspects can be provided without departing from the scope of the invention.

For example, although the diagnostic program is set in the server 7 in the above aspects, the diagnostic program may also be preset in the multifunction device 3 or the PC 4 while the CPU 70 of the server 7 is set to perform reception of product information and measurement results and transmission of diagnostic items and diagnostic results without performing transmission of the diagnostic program.

In addition, although the server 7 diagnoses the multifunction device 3 via the PC in the above aspects, the server 7 may also directly diagnose the multifunction device 3 without using the PC 4.

Further, although the present invention is applied to the multifunction device in the above aspects, the present invention may also be applied to other image forming devices such as printers or scanners or to terminal devices other than the image forming devices.

In addition, although the messages of the filters F1-Fn are written in Japanese and English in the above aspects, the messages may also be written in other languages.

What is claimed is:

1. A remote diagnosis device for diagnosing a state of a terminal device and outputting a diagnostic result, the remote diagnosis device comprising:
   a first obtaining unit that is configured to receive characteristics data, including at least information indicating an identification and characteristics of the terminal device;
   a filter group including a plurality of types of filters in which a diagnostic item for outputting is set according to the characteristics data of the terminal device;
   a filter selection unit connected to the first obtaining unit and connected to the filter group, the filter selection unit configured to select a filter corresponding to the characteristics data of the terminal device; and a diagnosis result outputting unit connected to the filter selection unit, the diagnosis result outputting unit configured to diagnose the state of the terminal device based on setting information of the filter selected by the filter selection unit, and configured to output the diagnostic result.

2. remote diagnosis device according to claim 1, further comprising a second obtaining unit that receives a measurement result of the state of the terminal device.

3. The remote diagnosis device according to claim 2, wherein the second obtaining unit receives the measurement result from at least one of the terminal device and the management device over a network.

4. The remote diagnosis device according to claim 2, further comprising:
   a storage unit that stores a measurement result of the state of each terminal device, received by the second obtaining unit; and
   a change unit that changes a determination condition of the diagnostic result for the measurement result in the filter corresponding to the terminal device, according to the measurement result stored in the storage unit.

5. The remote diagnosis device according to claim 1, wherein the diagnosis result outputting unit outputs the diagnostic result of the state and the corresponding diagnostic item to at least one of the terminal device and a management device over a network, the management device managing the terminal device.

6. The remote diagnosis device according to claim 1, wherein the first obtaining unit receives the characteristics data from at least one of the terminal device and a management device over a network, the management device managing the terminal device.

7. The remote diagnosis device according to claim 1, wherein the diagnostic item for outputting to at least one of the terminal device and a management device is set in the filters according to the characteristics of the terminal device, the management device managing the terminal device.

8. The remote diagnosis device according to claim 1, wherein a determination condition of the diagnostic result for the measurement result are set in the filters according to the characteristics of the terminal device.

9. The remote diagnosis device according to claim 1, further comprising:
   a program storage unit that stores collection programs, which allow at least one of the terminal device and a management device managing the terminal device over a network to collect measurement results of the state of the terminal device, while associating the collection programs respectively with groups, each group having common characteristics, into which a plurality of types of terminal devices are classified; and
   a program transmission unit that obtains the collection program corresponding to the characteristics data received by the first obtaining unit from the program storage unit and transmitting the obtained collection program to at least one of the terminal device and the management device over the network.

10. The remote diagnosis device according to claim 1, wherein information specifying a language for use when at least one of the terminal device and a management device managing the terminal device over a network notifies a user of the diagnostic result is included in the characteristics data, and wherein the diagnosis result outputting unit outputs the diagnostic result and the diagnostic item written in the language specified by the characteristics data.

11. The remote diagnosis device according to claim 1, wherein the characteristics of the terminal device includes model information of the terminal device.

12. The remote diagnosis device according to claim 1, wherein the characteristics of the terminal device includes specific information of the terminal device.

13. A remote diagnosis device for diagnosing a state of a terminal device and outputting diagnostic results the remote diagnosis device comprising:
   a first obtaining unit configured to receive product information, including at least information indicating characteristics of the terminal device from at least one of the terminal device and a management device, the first obtaining unit connected to the terminal device and configured to manage the terminal device, and the first obtaining unit connected to at least one of the terminal device and the management device;
   a second obtaining unit configured to receive a measurement result of the state of the terminal device from at least one of the terminal device and the management device, the second obtaining unit connected to at least one of the terminal device and the management device;
   a filter group including a plurality of types of filter, each filter having a plurality of diagnostic items set according to characteristics of a respective terminal device and each filter defining, for a diagnostic item, a diagnostic result which corresponds to a measurement result and which is for externally notifying a meaning of the measurement result for the respective terminal device;
   a filter selection unit configured to select a filter corresponding to the characteristics of the terminal device, the filter selection unit connected to the terminal device and connected to the filter group;
   a diagnostic result extracting unit connected to the filter selection unit and configured to extract diagnostic results from the selected filter based on the measurement results; and
   a diagnosis result outputting unit connected to the diagnostic result extracting unit and configured to output the diagnostic results extracted by the diagnostic result extracting unit.

14. The remote diagnosis device according to claim 13, wherein the diagnosis result outputting unit is arranged to output the diagnostic result and the corresponding diagnostic item to at least one of the terminal device and the management device over a network.

15. The remote diagnosis device according to claim 13, wherein a determination condition of the diagnostic result for the measurement result is set in the filters according to the characteristics of the terminal device.

16. The remote diagnosis device according to claim 13, further comprising:
   a program storage unit for storing collection programs, which allow at least one of the terminal device and a management device to collect measurement results of the state of the terminal device, while associating the collection programs respectively with groups, each group having common characteristics, into which a plurality of types of terminal devices are classified; and
   a program transmission unit for obtaining the collection program corresponding to the characteristics data received by the first obtaining unit from the program storage unit and transmitting the obtained collection program to at least one of the terminal device and the management device over the network.

17. The remote diagnosis device according to claim 13, further comprising:
- a storage unit for storing a measurement result of the state of each terminal device, received by the second obtaining unit; and
- a change unit for changing a determination condition of the diagnostic result for the measurement result in the filter corresponding to the terminal device, according to the measurement result stored in the storage unit.

18. The remote diagnosis device according to claim 13, wherein information specifying a language for use when at least one of the terminal device and a management device managing the terminal device over a network notifies a user of the diagnostic result is included in the characteristics data, and
- wherein the diagnosis result outputting unit is arranged to output the diagnostic result and the diagnostic item written in the language specified by the characteristics data.

19. A remote diagnosis system comprising:
- a terminal device;
- a management device connected to the terminal and configured to manage the terminal device; and
- a remote diagnosis device connected to the terminal and configured to diagnose a state of the terminal device and configured to output a diagnostic result, wherein the remote diagnosis device includes
  - a first obtaining unit that is configured to receive characteristics data, including at least information indicating an identification and characteristics of the terminal device;
  - a filter group including a plurality of types of filters in which a diagnostic item for outputting is set according to the characteristics data of the terminal device;
  - a filter selection unit connected to the first obtaining unit and connected to the filter group, the filter selection unit configured to select a filter corresponding to the characteristics data of the terminal device; and
  - a diagnosis result outputting unit connected to the filter selection unit, the diagnosis result outputting unit configured to diagnose the state of the terminal device based on setting information of the filter selected by the filter selection unit, and configured to output the diagnostic result.

20. A computer-readable medium having a computer executable program stored thereon, said program which, when executed by a computer in a remote diagnosis system that includes a terminal device, a management device for managing the terminal device, and a remote diagnosis device for diagnosing a state of the terminal device and outputting a diagnostic result, causes the computer to perform predetermined operations, the predetermined operations comprising:
- obtaining characteristics data, including at least information indicating an identification and characteristics of the terminal device;
- selecting a filter based on the obtained characteristics data from a filter group including a plurality of types of filters in which a diagnostic item for outputting is set according to the characteristics data of the terminal device;
- diagnosing the state of the terminal device based on setting information of the selected filter; and
- outputting the diagnostic result of the state.

21. A computer-readable medium having a program stored thereon, when executed by a computer, the program enabling a computer in a remote diagnosis system that includes a terminal device, a management device for managing the terminal device, and a remote diagnosis device for diagnosing a state of the terminal device and outputting a diagnostic result to perform predetermined operations comprising:
- obtaining product information, including at least information indicating characteristics of the terminal device, from at least one of the terminal device and the management device;
- obtaining a measurement result of the state of the terminal device from at least one of the terminal device and the management device;
- selecting a filter based on the obtained product information from a filter group including a plurality of types of filter, each filter having a plurality of diagnostic items set according to characteristics of a respective terminal device and each filter defining, for a diagnostic item, a diagnostic result which corresponds to a measurement result and which is for externally notifying a meaning of the measurement result for the respective terminal device;
- extracting diagnostic results from the selected filter based on the measurement results; and
- outputting the extracted diagnostic results.

* * * * *

UNITED STATES PATENT AND TRADEMARK OFFICE
CERTIFICATE OF CORRECTION

PATENT NO. : 7,480,592 B2
APPLICATION NO. : 11/270743
DATED : January 20, 2009
INVENTOR(S) : Masaaki Hori Page 1 of 1

It is certified that error appears in the above-identified patent and that said Letters Patent is hereby corrected as shown below:

In Column 13, Claim 2, Line 9:
Please delete "remote diagnosis" and insert --The remote diagnosis--

Signed and Sealed this

Eighteenth Day of August, 2009

David J. Kappos
*Director of the United States Patent and Trademark Office*